Figure 4:
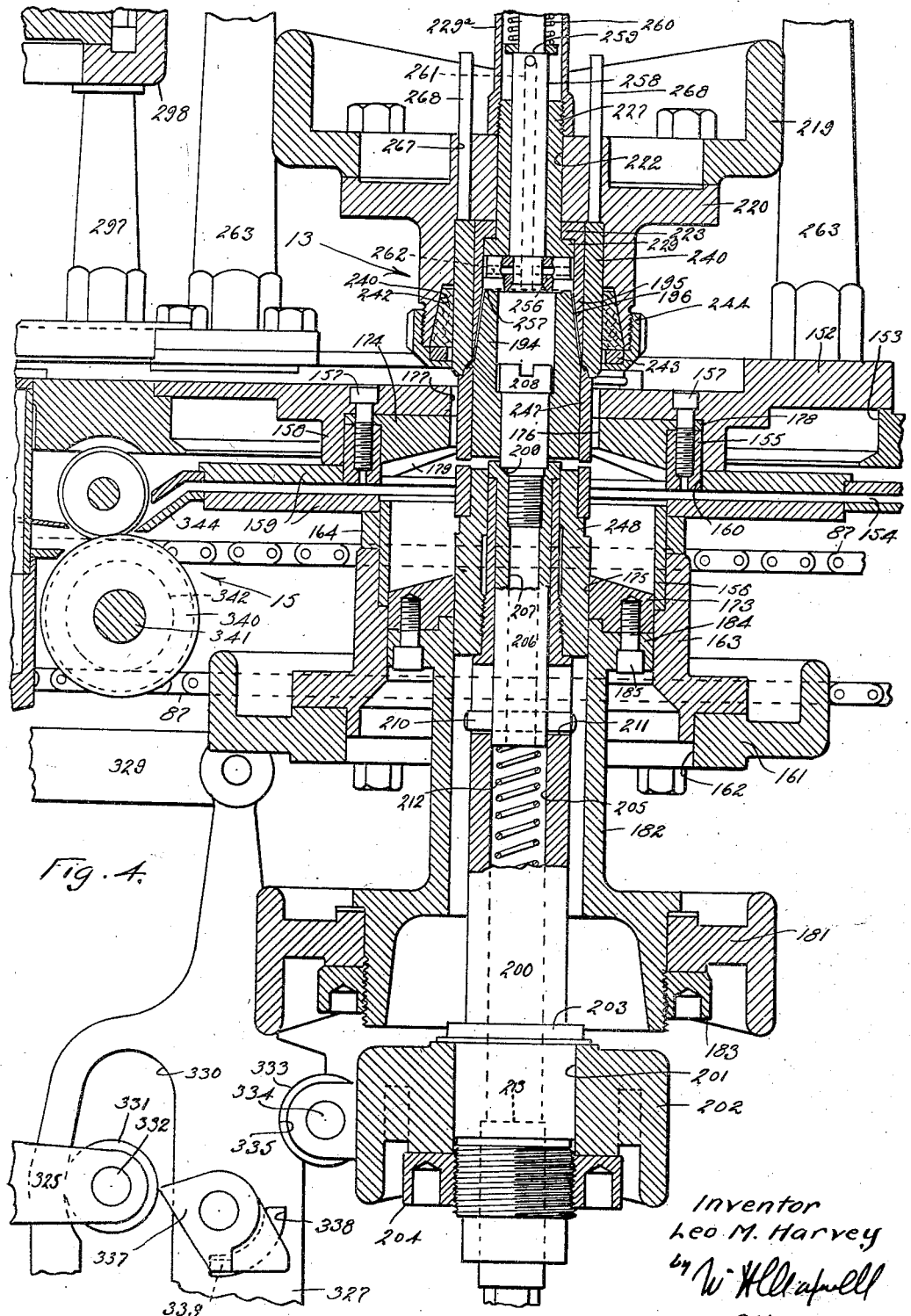

Feb. 3, 1948.  L. M. HARVEY  2,435,308
MACHINE FOR MAKING PAPER CUPS
Filed Dec. 17, 1942   12 Sheets-Sheet 1
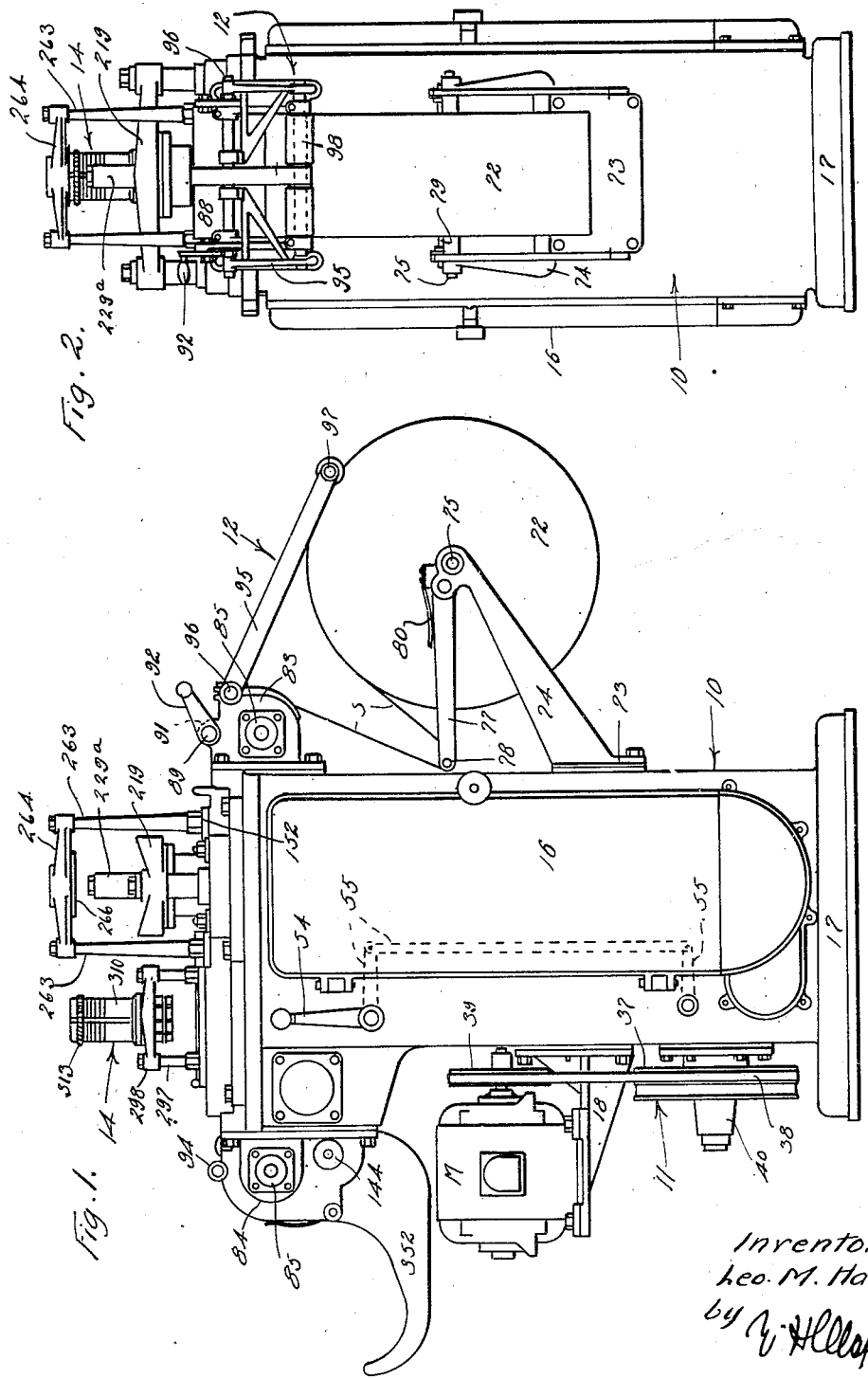
Inventor
Leo. M. Harvey
by V. H. Clapwell
Attorney

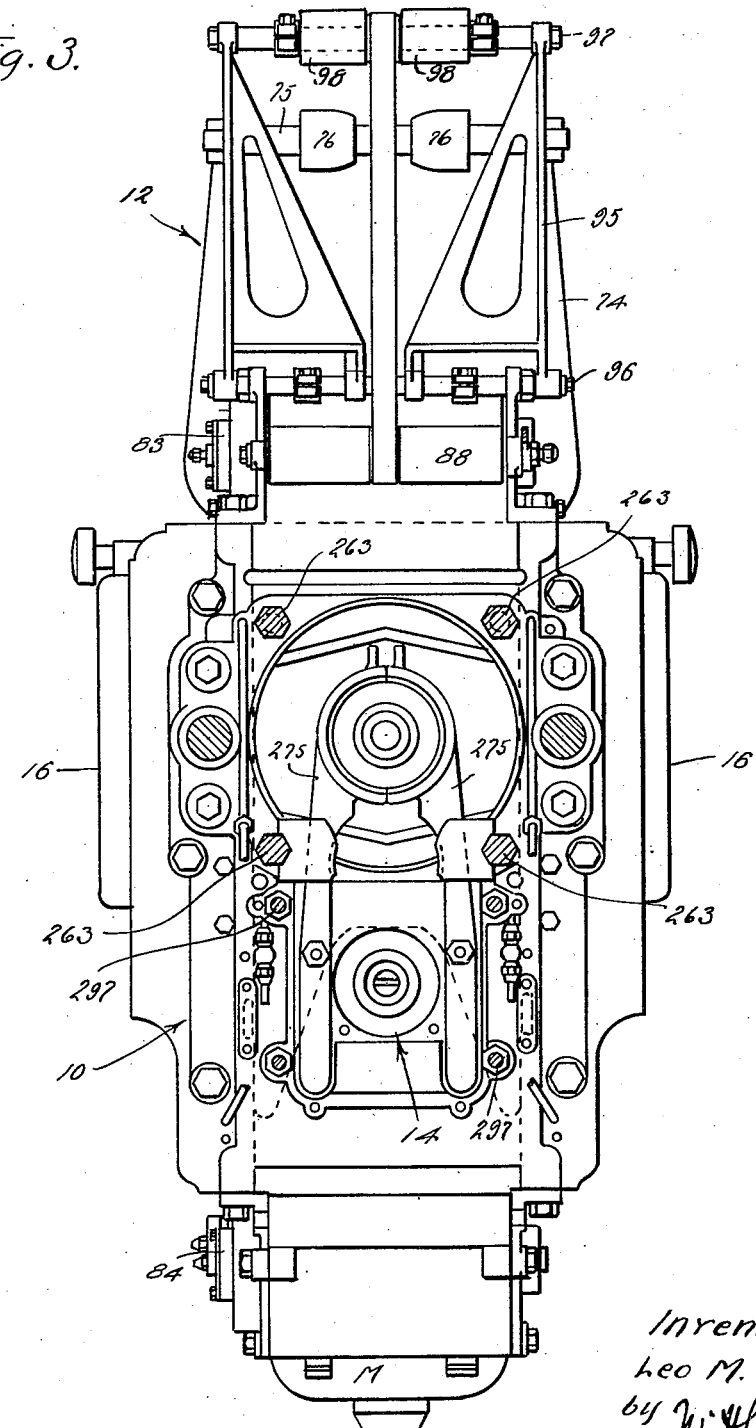

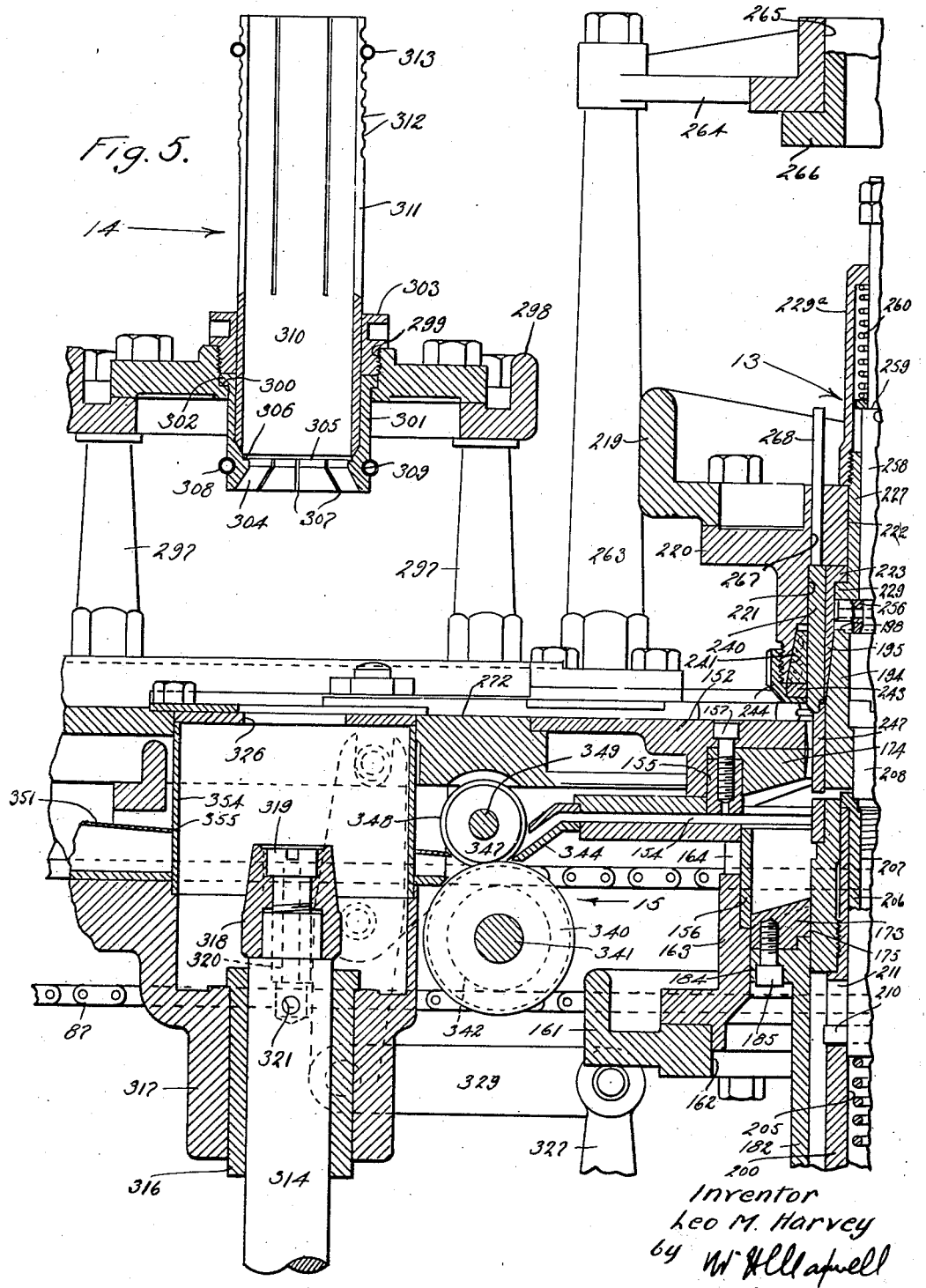

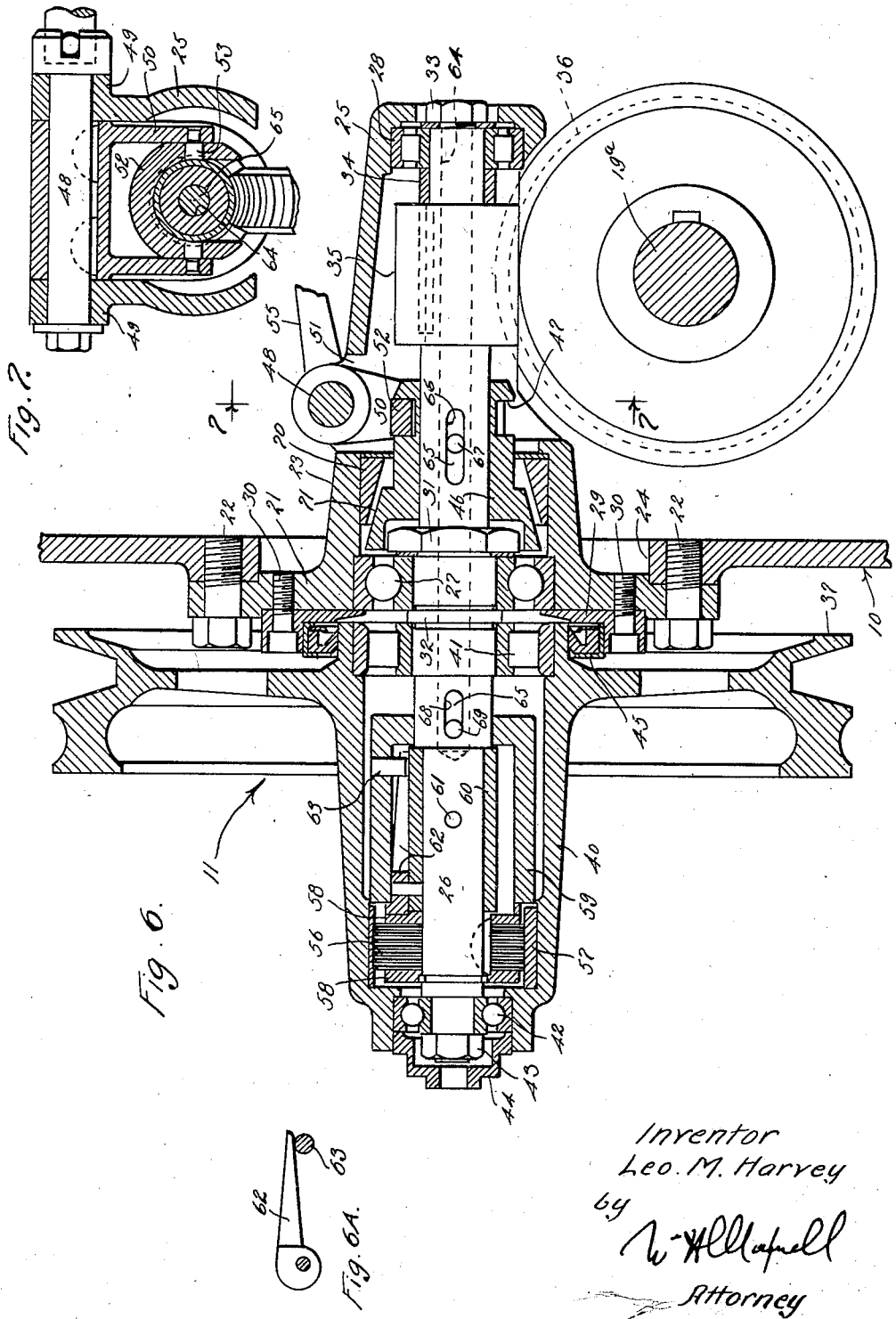

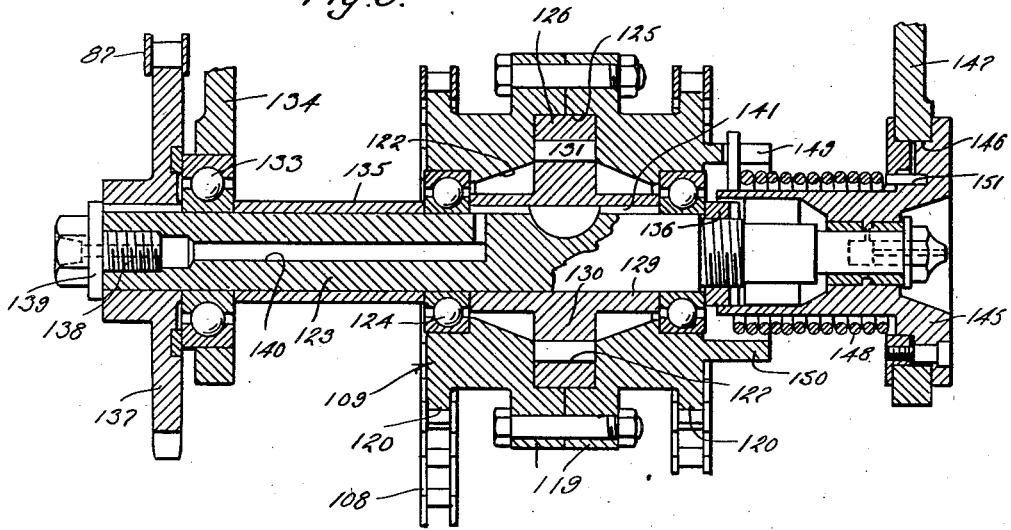
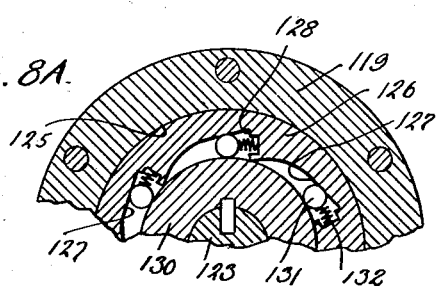
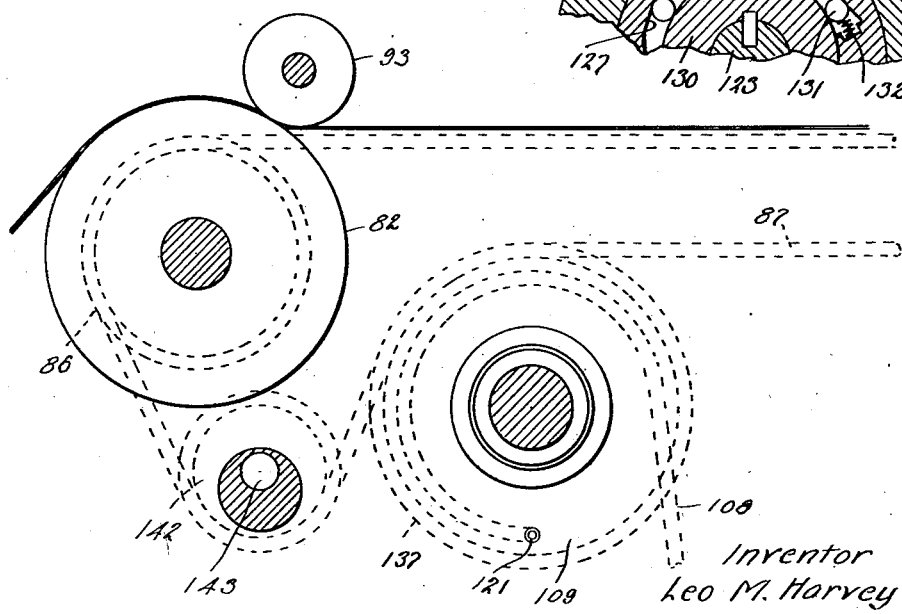

Feb. 3, 1948.　　　　　L. M. HARVEY　　　　　2,435,308
MACHINE FOR MAKING PAPER CUPS
Filed Dec. 17, 1942　　　12 Sheets-Sheet 7
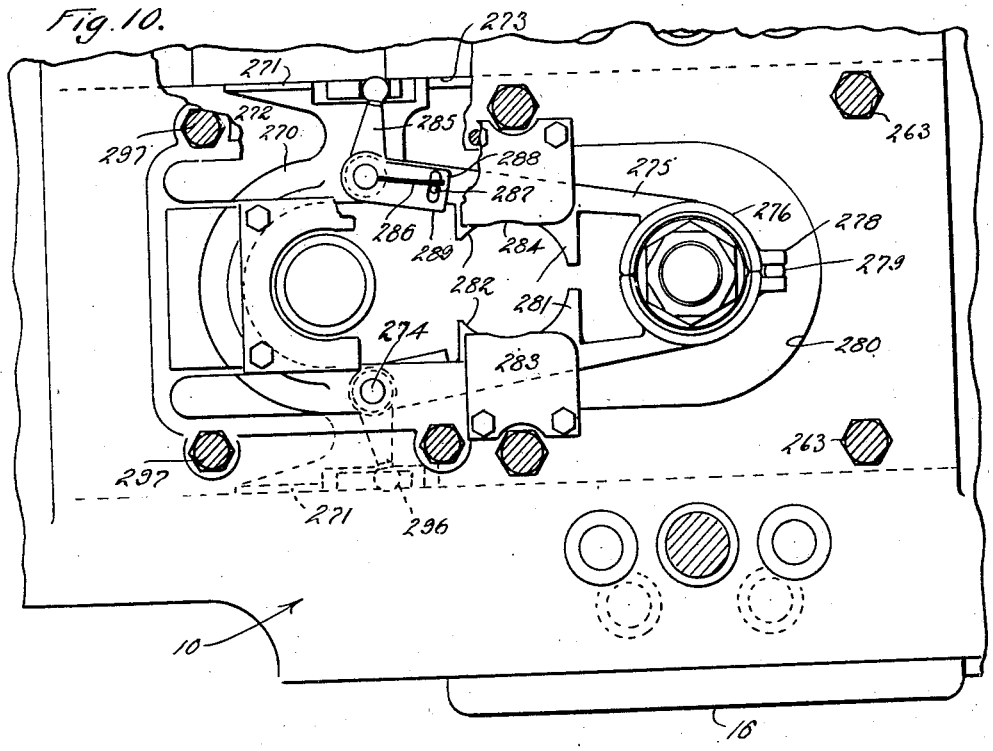
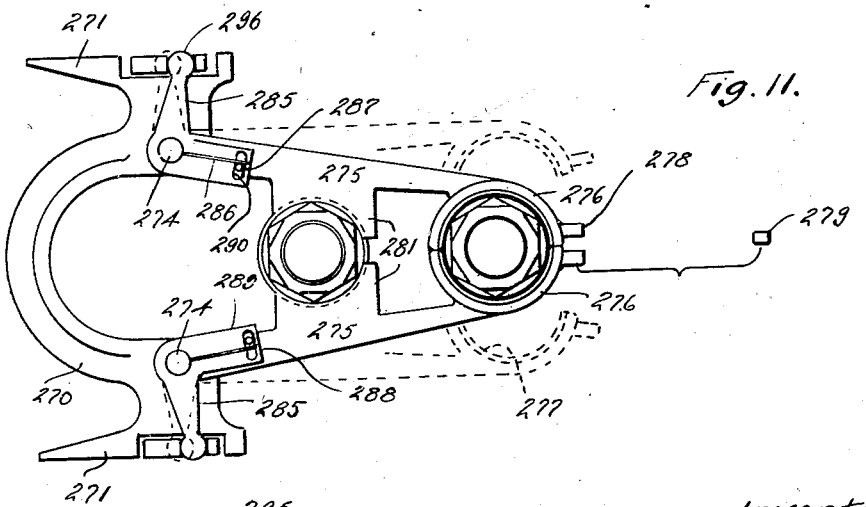
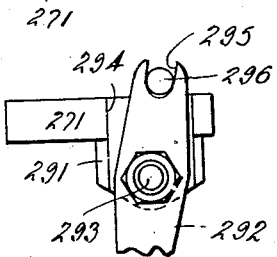
Inventor
Leo M. Harvey
by
Attorney Feb. 3, 1948. L. M. HARVEY 2,435,308
MACHINE FOR MAKING PAPER CUPS
Filed Dec. 17, 1942 12 Sheets-Sheet 8
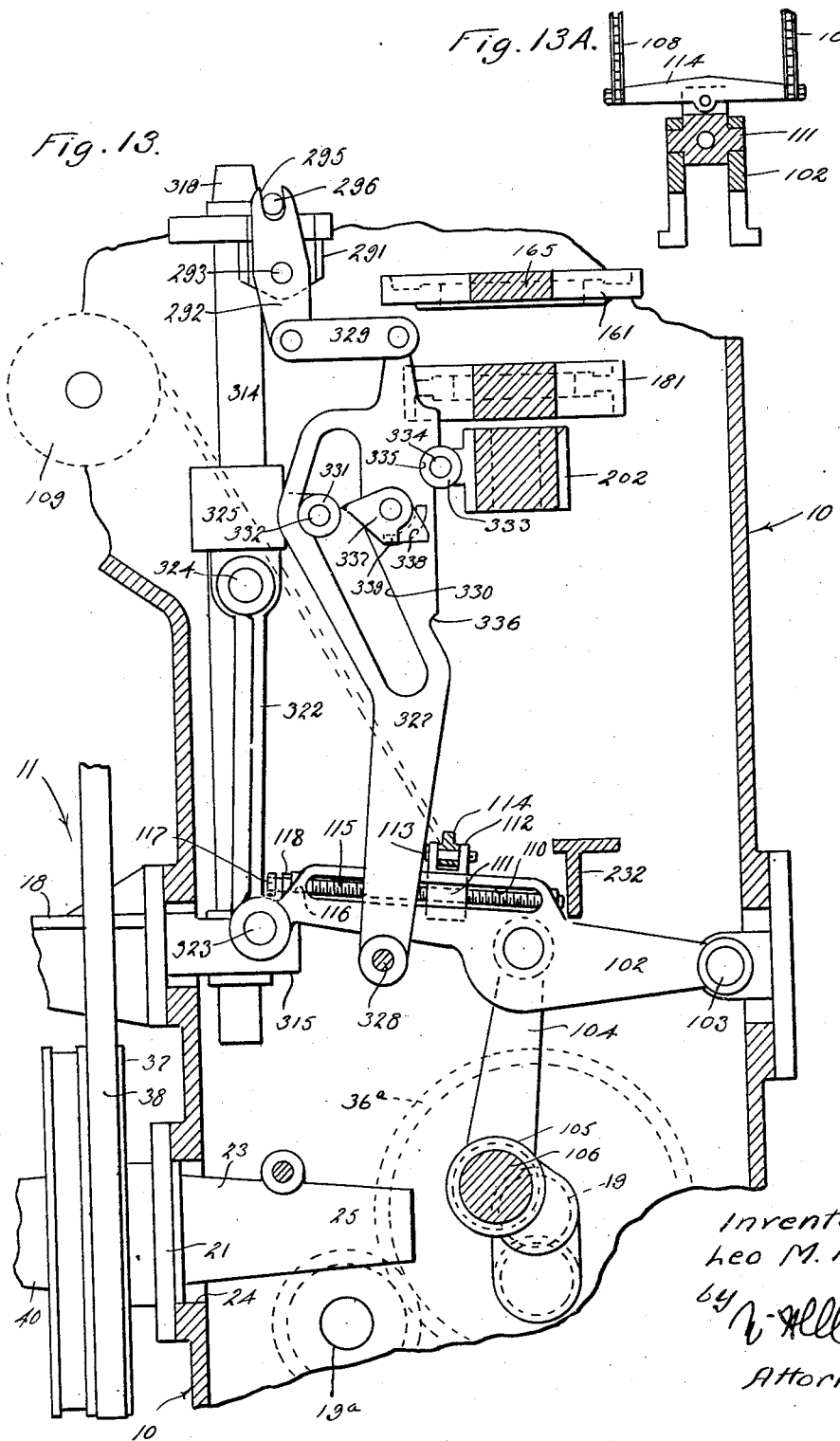

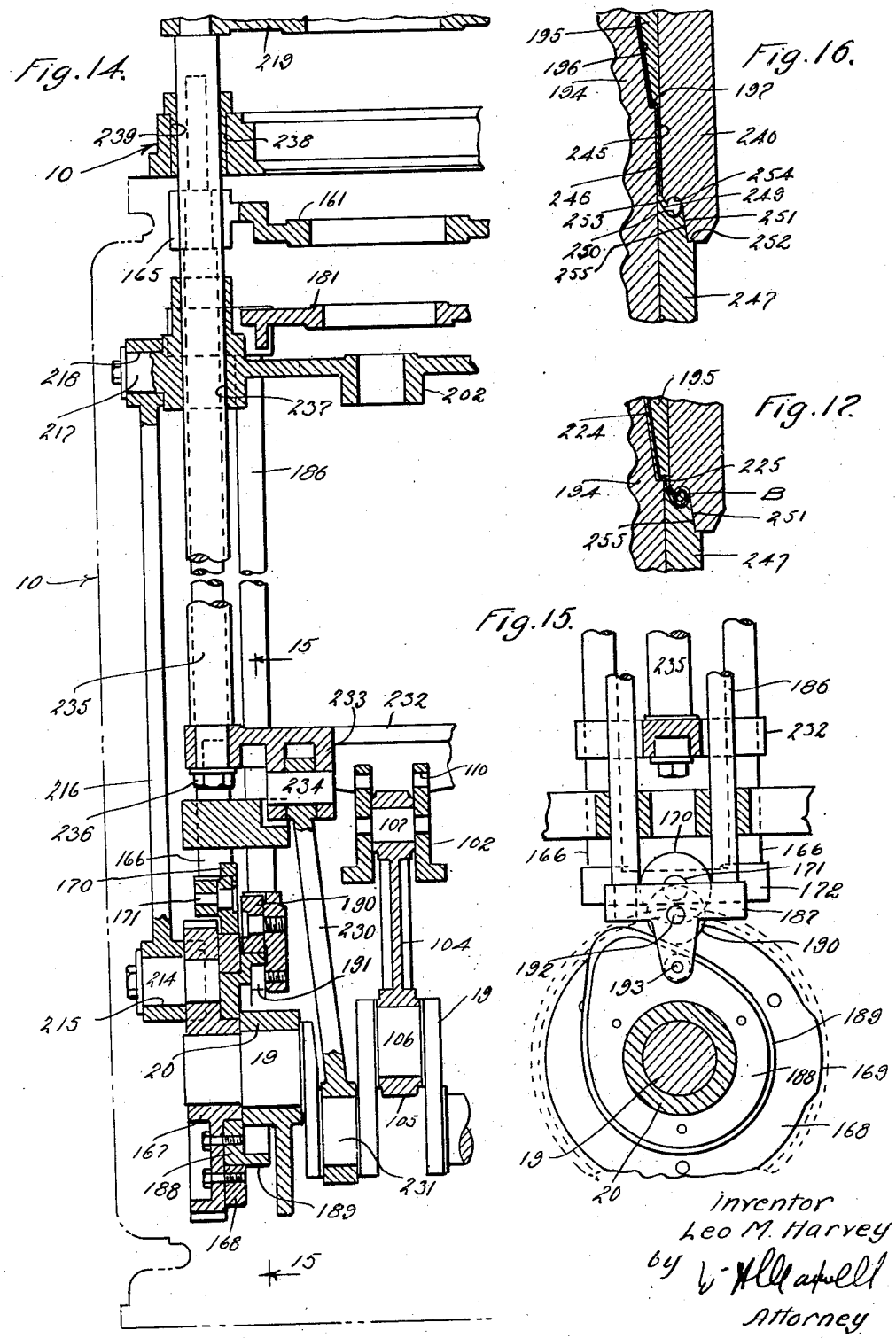

Feb. 3, 1948.  L. M. HARVEY  2,435,308
MACHINE FOR MAKING PAPER CUPS
Filed Dec. 17, 1942  12 Sheets-Sheet 11
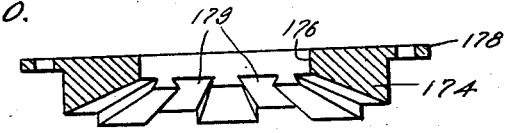
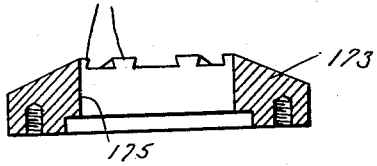
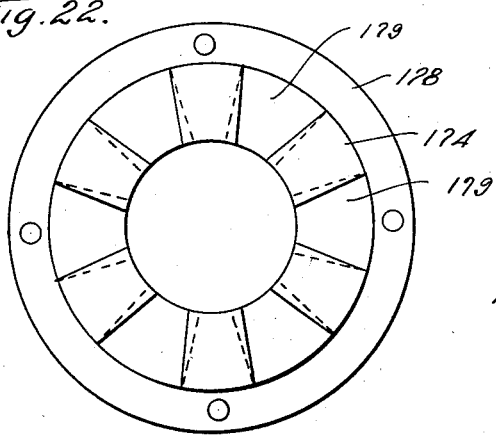
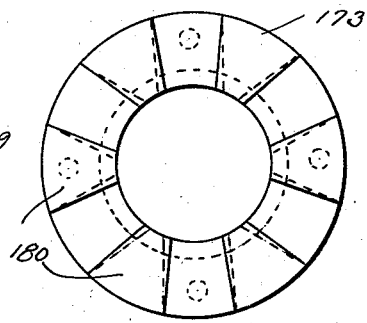
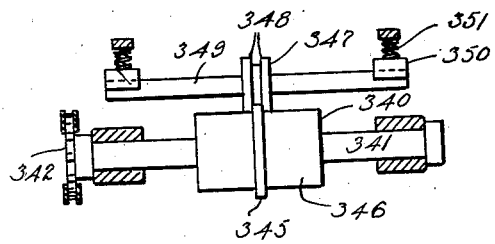
Inventor
Leo M. Harvey
by
Attorney Feb. 3, 1948.                L. M. HARVEY                2,435,308
                    MACHINE FOR MAKING PAPER CUPS
                    Filed Dec. 17, 1942         12 Sheets-Sheet 12

Inventor
Leo M. Harvey
by W. Ellapwell
Attorney

Patented Feb. 3, 1948

2,435,308

UNITED STATES PATENT OFFICE 2,435,308

MACHINE FOR MAKING PAPER CUPS

Leo M. Harvey, La Canada, Calif.

Application December 17, 1942, Serial No. 469,306

15 Claims. (Cl. 93—69)

This invention relates to the manufacture of containers, such as paper cups, and has more particular reference to a machine for making paper cups, and the like. A general object of this inven is to provide a practical, dependable and particularly effective machine for making paper cups.

Another object of this invention is to provide a machine for making paper cups, and the like, in which a continuous strip of paper stock is fed to the machine and novel cutting means at the cup shaping and forming dies cuts a cup blank from the stock immediately preceding each series of operations of the dies, and holds the blank in the central position with respect to the dies. The paper feed means and blank cutting means are synchronized with the die movements and are such that a newly cut accurately centered blank is cut and left between the dies immediately prior to each series of die operations.

Another object of this invention is to provide a paper cup machine of the character referred to in which the dies are visible and are readily accessible for replacement by dies of different sizes.

Another object of this invention is to provide a paper cup machine in which the paper stock and the cups formed therefrom are fed across the upper side of a support or table where they are plainly visible and where they do not become soiled by oil or other lubricant. In the machine of the present invention the driving mechanisms, etc., are all housed below the die means so that they may be thoroughly lubricated without danger of soiling the paper or the cups.

Another and important object of this invention is to provide a machine of the character referred to that may be easily and quickly conditioned to produce cups of any selected size within a very wide range of sizes. A simple adjustment of the paper feed means varies the amount of paper fed to the blank cutting and cup forming mechanism. The active elements of the blank cutting and cup shaping mechanism are easily accessible and are readily replaceable by corresponding elements of different sizes and the cup forming elements are spring held so that the mechanism is adapted to shape cups within a wide range of sizes without altering the stroke of the operating mechanism or otherwise changing the machine. The cup receiving and stacking means embodies readily replaceable elements for receiving and holding the cups as they are stacked one within the other.

Another object of this invention is to provide a machine of the character mentioned that produces strong tight containers having side walls strengthened by folds or pleats, having a rolled rim lending strength to the side walls and providing a finished edge, and having a bottom wall strengthened by an annular shoulder.

Another object of this invention is to provide a cup forming machine of the character referred to in which the operation of all of the parts and mechanism may be readily started and stopped by the simple operation of a manual clutch lever and the paper feed means may be manually stopped and then started at will by the simple operation of a roll positioning handle.

Another object of this invention is to provide a cup forming machine that is entirely automatic, operating without the aid or attention of an attendant. The feeding, cutting, cup forming, cup transferring and cup stacking operations are entirely automatic and are synchronized so that the machine automatically produces cups so long as it is in operation. The feed means is adapted to carry a large supply of paper to provide for the prolonged, continuous operation of the machine.

Another object of this invention is to provide a paper cup machine that has a high production rate and which embodies compact operating or driving mechanisms for operating the several dies, etc.

A further object of this invention is to provide a novel combination and assembly of dies for forming the flutes in the blank, for giving the cup its shape and for forming the bead on the cup, which dies are coaxial and in the relation where certain of them telescope one into the other.

Figure 18:
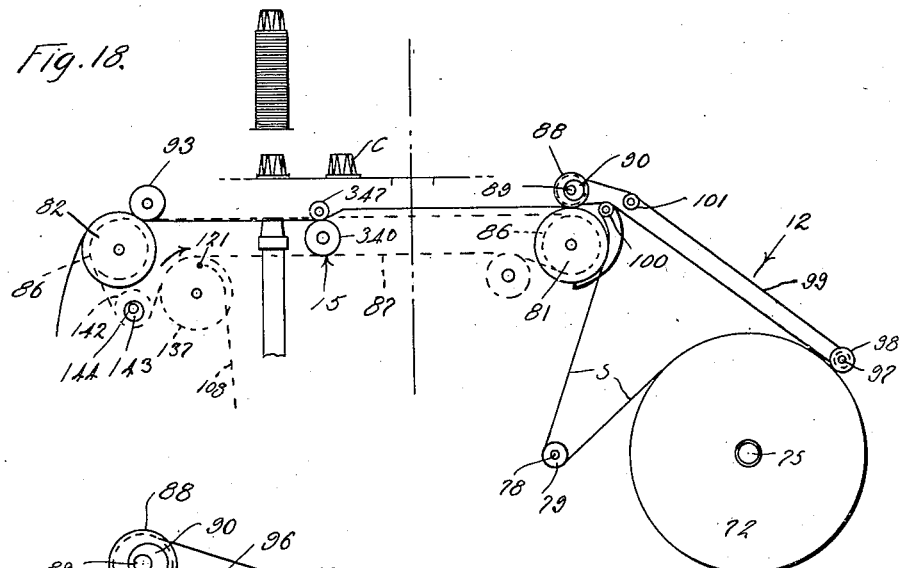
Figure 19:
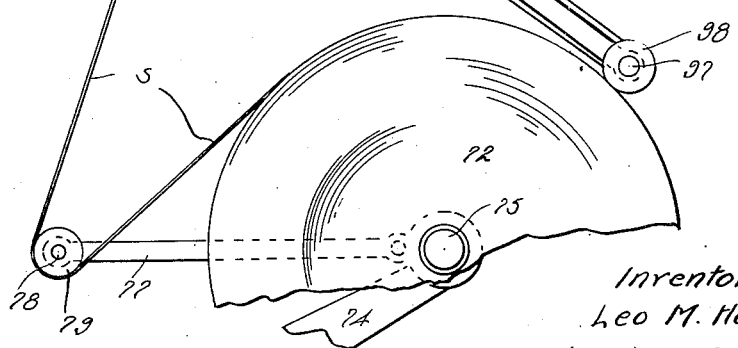
Figure 25:
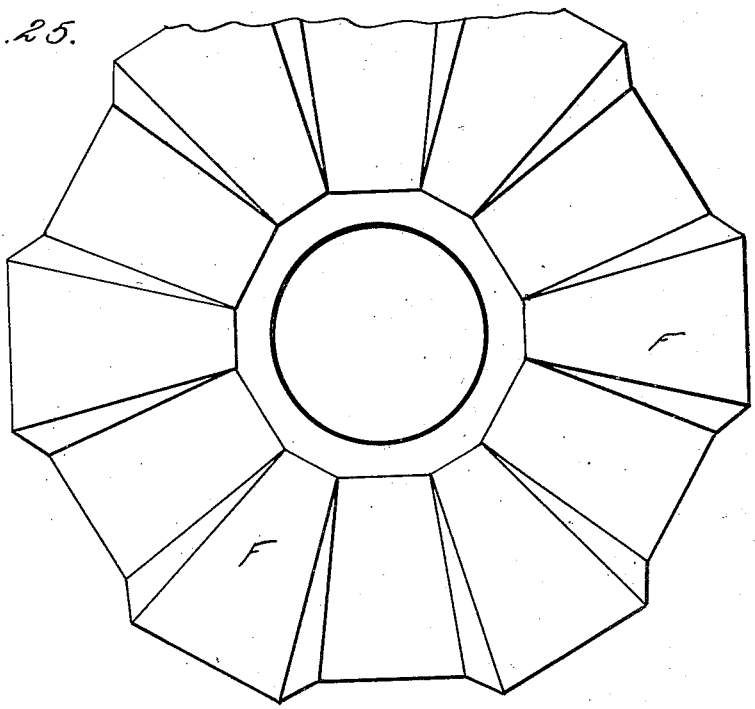
Figure 26:
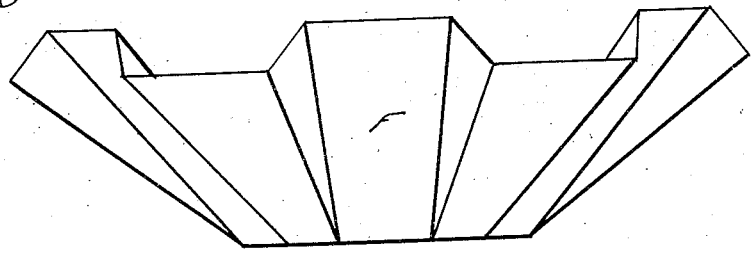
Figure 27:
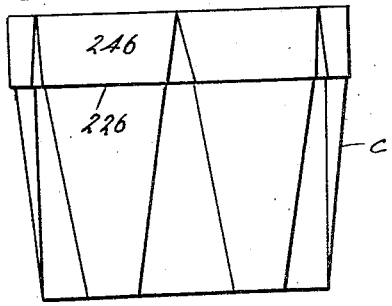
Figure 28:
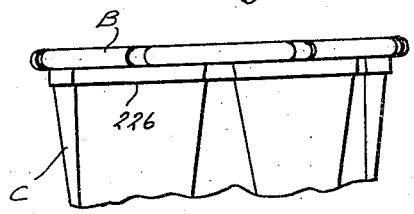

The various objects and features of my invention will be fully understood from the following detailed description of a typical preferred form and application of my invention, throughout which description reference is made to the accompanying drawings, in which:

Fig. 1 is a front elevation of the machine provided by this invention. Fig. 2 is a side elevation of the machine showing the paper supply and feed means. Fig. 3 is an enlarged plan elevation of the machine with the most elevated parts appearing in horizontal cross section. Fig. 4 is an enlarged fragmentary vertical detailed sectional view illustrating the die means in the operated condition and showing adjacent parts of the machine. Fig. 5 is a view similar to Fig. 4 illustrating the cup ejecting or stacking means, a portion of the paper feed means, the scrap cutting means, etc. Fig. 6 is an enlarged longitudinal detailed sectional view of the main clutch of the machine. Fig. 6a is an elevation view of one of the cams of the clutch shown in Fig. 6. Fig. 7 is a transverse detailed sectional view taken as indicated by line 7—7 on Fig. 6. Fig. 8 is an enlarged longitudinal detailed sectional view of a sprocket and clutch assembly embodied in the paper feed means of the invention. Fig. 8ᵃ is a fragmentary transverse detailed sectional view of the free running clutch means of the structure shown in Fig. 8. Fig. 9 is an enlarged fragmentary vertical detailed sectional view of a portion of the paper feed means. Fig. 10 is an enlarged fragmentary horizontal detailed sectional view illustrating the cup transferring means. Fig. 11 is a plan view of certain elements of the cup transferring means showing the two positions of the cups during the stage transference and illustrating the different positions of the transferring elements. Fig. 12 is a fragmentary vertical detailed sectional view illustrating a portion of the means for actuating the cup transferring elements. Fig. 13 is an enlarged fragmentary vertical detailed sectional view showing the mechanism for operating the cup transferring means. Fig. 13ᵃ is a vertical detailed sectional view of the adjustable connection between the walking beam and the chains. Fig. 14 is an enlarged fragmentary vertical detailed sectional view illustrating the several means for operating the dies. Fig. 15 is an enlarged fragmentary vertical detailed sectional view taken as indicated by line 15—15 on Fig. 14. Fig. 16 is an enlarged fragmentary vertical detailed sectional view showing the dies in the position preceding the bead forming operation. Fig. 17 is a view similar to Fig. 16 showing the dies in position at or near the completion of the bead. Fig. 18 is a diagrammatic view illustrating the paper feed means and the cup transferring means. Fig. 19 is a fragmentary, diagrammatic view of the paper feeding means. Fig. 20 is a vertical detailed sectional view of the flute forming die removed from the machine. Fig. 21 is a view similar to Fig. 20 illustrating the flute forming punch. Fig. 22 is a bottom elevation of the flute forming die. Fig. 23 is a plan elevation of the flute forming punch. Fig. 24 is a vertical sectional view of the scrap cutting means apart from the other elements of the machine with certain of the members in side elevation. Fig. 25 is an enlarged plan view of a cup blank after the flutes have been formed therein. Fig. 26 is an enlarged side elevation of the blank provided with the flutes. Fig. 27 is a side elevation of the cup following the flute forming, cup shaping and ironing operations and Fig. 28 is a fragmentary side elevation of the completed cup.

The cup forming machine of the present invention may be said to comprise, generally, a supporting and housing case 10, a power means or drive means 11 for driving or operating the various mechanisms of the machine, a paper feed means 12, a die mechanism 13 which receives the paper from the feed means 12 and cuts it into blanks and forms paper cups therefrom, a cup transferring and stacking means 14 for withdrawing the completed cups from the mechanism 13, and scrap handling means 15.

The case 10 supports the various elements of the machine and houses portions of the driving means 11 and associated parts. The case 10 may be a generally square or rectangular upright box-like structure. The opposite sides of the case 10 are provided with access openings closed by hinged doors 16. The top of the case 10 is flat and horizontal to carry certain elements of the paper feed means 12, the die mechanism 13, etc. The walls of the case are closed and sealed to prevent the escape of the lubricant for the driving mechanism. The lower portion of the case 10 may be provided with a suitable base 17 adapted to rest on the floor or other support.

In the preferred form of the invention the machine is entirely self-contained and embodies its own power means. In the construction illustrated the power means includes an electric motor M of suitable rating mounted on a bracket 18 secured on a wall of the case 10. The motor M is mounted on what I will term the rear side of the case 10. The drive means 11 is characterized by a single crank shaft 19 and all of the working parts of the machine are driven from this single crank shaft. In the preferred construction illustrated, the motor M is mounted to have its shaft horizontal and the crank shaft 19 is rotatably mounted in the lower portion of the case 10 to be below the shaft of the motor M and to extend at right angles to the motor shaft. The crank shaft 19 is rotatably supported by suitable spaced bearings 20 in the case. A clutched worm drive is provided between the motor M and the crank shaft 19.

The clutched drive includes a flanged mounting plate or carrier 21 secured to the rear wall of the case 10 by screws 22 and having a hub 23 which projects freely through an opening 24 in the case wall (see Figs. 6 and 7). The hub 23 has an inward extension 25 which projects some distance into the case 10. A horizontal shaft 26 extends longitudinally through the hub 23 and its extension 25 and continues outwardly from the case 10. An anti-friction bearing 27 in the carrier 21 and an anti-friction bearing 28 in the inner part of the extension 25 support the shaft 26 for free rotation. The bearing 27 has shouldered engagement in the carrier 21 and is retained by a ring 29 secured to the carrier 21 by screws 30. A nut 31 is threaded on the shaft 26 at one side of the bearing 27 and a rib or annular flange 32 is provided on the shaft at the other side of the bearing 27 so that the shaft 26 is held against endwise movement. A nut 33 is provided on the inner extremity of the shaft 26 at one side of the bearing 28 and a bushing or spacer 34 is provided on the shaft at the other side of the bearing 28 and these elements may assist in holding the shaft against endwise movement. A worm 35 is fixed or keyed on the shaft 26 at the end of the spacer 34 and meshes with a worm wheel 36 keyed to a counter shaft 19ᵃ. The under side of the hub extension 25 is open to pass or admit the worm wheel 36. A geared drive 36ᵃ is provided between the counter shaft 19ᵃ and the crank shaft 19.

The power means or drive means 11 further includes a pulley 37 rotatably supported on the projecting portion of the clutch shaft 26 at the exterior of the case 10. A belt 38 operates over the pulley 37 and a pulley 39 fixed on the shaft of the motor M so that the pulley 37 is driven by the motor. The pulley 37 may be proportioned to serve as a fly wheel and has a long hub 40 which surrounds the projecting portion of the shaft 26 in spaced relation thereto. An anti-friction bearing 41 rotatably supports the inner portion of the pulley 37 on the clutch shaft 26. The bearing 41 has shouldered engagement in the pulley 37 and has its inner end engaged against the flange 32. An anti-friction bearing 42 is mounted on a reduced outer end portion of the clutch shaft 26 and rotatably carries the outer part of the pulley hub 40. The inner side of the bearing 42 engages against a shoulder on the shaft 26 and a nut 43 is provided on the end of the shaft to retain the bearing 42 and to assist in preventing endwise movement of the pulley 37. A cap 44 may cover the nut 43. It is preferred to provide a sealing means or sealing assembly 45 on the above mentioned ring 29 to seal between the ring and the hub of the pulley 37 to retain lubricant within the clutch assembly and to prevent the entrance of dirt into the assembly.

The clutch of the drive means 11 includes a sleeve 46 freely slidable on the shaft 26 and located between the nut 31 and the worm 35. An external annular groove 47 is provided in the sleeve 46. Fork means is provided for shifting the sleeve 46 back and forth. This means includes a shaft or pin 48 turnably carried by spaced lugs 49 on the upper side of the hub extension 25 (see Fig. 7). A fork 50 is pivotally supported by the pin 48 between the lugs 49 and projects downwardly through an opening 51 in the upper wall of the extension 25. A yoke 52 is located between the arms of the fork and is pivotally secured thereto by pivot pins 53. The yoke 52 rides or engages in the groove 47 of the sleeve 46. Manual means is provided for effecting longitudinal shifting of the sleeve 46. A clutch handle or lever 54 is mounted on a side of the case 10 at a conveniently accessible point near the upper end of the case (see Fig. 1). A suitable mechanical linkage 55 operatively connects the lever 54 with the fork 50. It will be seen how manual operation of the lever 54 will result in axial shifting of the sleeve 46 back and forth along the clutch shaft 26.

The clutch means further includes an assembly of friction discs 56 arranged within the outer portion of the pulley hub 40 and an operative connection between the shiftable sleeve 46 and the disc assembly for controlling or operating the latter. The discs 56 are disposed within a tubular shell 57 fixed in the pulley hub 40 and are engaged between spaced collars 58 secured on the shaft 26. Alternate discs 56 are keyed or fixed to the shaft 26 and alternate discs 56 are keyed or fixed to the shell 57. that is. every other disc 56 is fixed to the shaft 26 and the other discs are fixed in the shell 57. The discs 56 are adapted to freely pass one another without engagement or appreciable friction when the clutch is "released."

The means for operating or controlling the clutch disc assembly 56 includes a sleeve 59 which freely surrounds the shaft 26 within the pulley hub 40. An inner sleeve 60 is spaced within the sleeve 59 and is secured to the shaft 26 by a pin 61 or other means. The inner sleeve 60 carries one or more pivoted dogs 62 which are operable to compress the clutch disc assembly 56 to provide for the transmission of rotation between the pulley 37 and the clutch shaft 26. The dogs 62 act against the inner collar or ring 58. Outward movement of the outer sleeve 59 serves to actuate the dogs 62 to provide the clutching engagement at the discs 56. Pins 63 project inwardly from the outer sleeve 59 and are adapted to have camming engagement with the dogs 62 to pivot or actuate the dogs when the sleeve 59 is shifted outwardly.

An operative connection is provided between the fork operated sleeve 46 and the dog actuating sleeve 59. The clutch shaft 26 is drilled or bored from its inner end to have a longitudinal opening 64. A shift pin 65 is shiftable longitudinally in the opening 64. The shift pin 65 serves to transmit movement from the sleeve 46 to the sleeve 59. A longitudinal slot 66 is provided in the shaft 26 to communicate with its opening 64 and a pin 67 is engaged in or secured to the sleeve 46 and engages with or is connected to the shift pin 65 to connect the yoke and shift pin. A longitudinal slot 68 is provided in the clutch shaft 26 at a point spaced outwardly from the bearing 41 and a pin 69 is secured to or carried by the outer shaft sleeve 59 and operates in the slot 68. In practice the pin 69 may pass completely through the slot 68 and through an opening in the shift pin 65. The pins 67 and 69 have sufficient longitudinal movement in their respective slots 66 and 68 to provide for movement of the sleeve 59 between the position where the clutch is released and the position where the clutch disc assembly 56 is engaged to transmit rotation from the pulley 37 to the clutch shaft 26.

It is preferred to incorporate a brake means in the clutched drive so that the mechanism may be quickly stopped when the clutch is disengaged or released. This brake means may include a tubular brake ring 70 secured within the hub 23 and having shouldered engagement in the hub. The brake ring 70 has a tapered internal surface. The sleeve 46, which surrounds the clutch shaft 26 and which is operated by the fork and yoke assembly, carries a tapered or frusto-conical brake part 71 which is engageable in the ring 70 to brake or stop movement of the machine parts. It will be seen that when the clutch handle or lever 54 is moved in one direction the sleeve 46 moves outwardly so that the shift pin 65 and outer sleeve 59 likewise move outwardly and upon outward movement of the sleeve 59 the pins 63 actuate the dogs 62 to engage the disc assembly 56 for the transmission of rotation from the pulley 37 to the shaft 26 and thus drive the crank shaft 19. Upon movement of the clutch lever 54 in the other direction the sleeve 46, the shift pin 65 and the sleeve 59 are moved inwardly to release the disc assembly 56 and thus "disengage" the clutch and the brake part 71 is brought into cooperation with the brake ring 70 to stop movement of the machine parts. It is to be understood that a suitable switch means is provided for the control of the motor M.

The feed means 12 operates to intermittently advance or feed a web of paper or other material to the mechanism 13 which cuts the cup blanks therefrom and then forms the blanks into the completed cups. The feed means 12 embodies several important features of the invention. For example, it embodies means for supporting or employing a large-capacity supply roll 72 of waxed paper, or the like, and automatically intermittently withdraws a predetermined length of paper from this supply and delivers it to the cutting and forming mechanism 13 in timed relation thereto. The feed means 12 is readily regulable to advance any desired amount or length of the paper or material to provide for the making of cups throughout a very wide range of cup sizes. This adjustment or regulation, together with appropriate changes in the dies of the mechanism 13, adapts the single machine for the manufacture of a wide range of containers or cups. The feed means 12 operates in timed synchronism with the mechanism 13 and is positive and efficient in its feeding of the paper as the supply roll reduces in diameter until completely exhausted.

The feed means 12 includes a structure for supporting a supply of the material or paper of which the cups are to be formed. This structure may include a support or bracket 73 mounted on the front of the case 10 and carrying a pair of outwardly or forwardly projecting arms 74. A horizontal shaft 75 extends between and is supported by the outer portions of the rigid arms 74. The shaft 75 serves to carry the supply roll 72 of paper. The roll 72 comprises a single continuous web or length of waxed paper or other material of which the cups are to be formed. As illustrated, the shaft 75 is adapted to carry a large supply roll 72. Adjustable spools 76 are provided on the shaft 75 to center and support the roll 72 (Fig. 3). It is to be understood that the roll 72 is readily replaced when exhausted. The supply roll 72 is positioned so that the web or strip S of the paper passes from the upper portion of the roll toward the front of the case 10.

Idler means is provided to prevent the development of slack in the strip S as it passes from the roll 72 to the feed means proper of the machine. A pair of levers or arms 77 is pivotally supported on the end portions of the shaft 75 and projects rearwardly toward the case 10. A shaft 78 extends between the end portions of the arms 77 and supports a freely rotatable roll 79. This roll 79 is in the nature of an idler or tensioning roll. The paper strip S passes down under the roll 79 and continues back up to the feed means proper of the machine. It is preferred to spring load the arms 77 so that a proper tension is maintained on the strip S and so that the paper will not buckle or develop excessive slack. In the construction illustrated leaf springs 80 are secured to the bracket arms 74 and bear downwardly on the arms 77 so that the idler roll 79 is constantly urged downward.

The feed means 12 further includes a pair of spaced feed rolls 81 and 82 for advancing the strip S across the top of the machine (see Figs. 9 and 18). Mounting means or brackets 83 and 84 are provided on the front and the rear walls, respectively, of the case 10 adjacent the top of the case to carry the feed rolls 81 and 82 and the associated parts. The feed rolls 81 and 82 are carried by horizontal shafts which are rotatably supported by suitable bearings 85 on the brackets 83. It is preferred to face or cover the feed rolls 81 and 82 with rubber or friction material to assure the positive advance of the paper strip S. In accordance with the invention the feed rolls 81 and 82 are connected for simultaneous intermittent rotation. A sprocket 86 is provided on an end of each feed roll 81 and 82 and an endless chain 87 operates over the two sprockets 86. The chain 87 is operated or driven by the power means by a drive to be described below. A roll 88 is located above the forward feed roll 81 to cooperate with the paper strip S to maintain the strip in frictional cooperation with the feed roll so that the strip is positively advanced. The roll 88 is carried by a shaft 89 which is eccentric with respect to its end portions 90 (see Fig. 18). These end portions 90 are turnably mounted in suitable bearings 91 on the forward bracket 83 and a lever or handle 92 is fixed to one end of the shaft 89 so that the shaft may be manually turned. The operator may move the roll 88 into and out of cooperation with the strip S by merely shifting or operating the handle 92. When the handle 92 is moved in one direction the roll 88 is lowered to press against the strip S and thus maintain the strip in engagement with the forward feed roll 81 to be advanced by the same. When the handle 92 is turned in the other direction the roll 88 is raised from the strip S and the strip is no longer driven or advanced by the roll 81. Thus, the movably supported roll 88 forms a convenient means for initiating and stopping the advancement of the paper strip S as required during operation of the machine. A roll 93, similar to the roll 88, is provided above the rear feed roll 82. The shaft of the roll 93 is carried by suitable bearings 94 on the rear bracket 84. The roll 93 has its axis spaced forwardly from the axis of the rear feed roll 92 so that it is particularly effective in maintaining the paper strip S in engagement with the face of the roll 82. It is preferred to face or cover the rolls 88 and 93 with rubber or friction material. The rear driving roll or feed roll 82 advances or ejects the scrap paper remaining after the cup blanks have been cut from the strip S by the mechanism 13.

The invention preferably includes means for aiding in removing or withdrawing the paper strip S from the supply roll 72. This means includes a pair of arms 95 pivotally supported by a pin 96 secured to the forward bracket 83. The arms 95 project forwardly and downwardly to pass above the center of the supply roll 72 and are preferably curved upwardly so that they do not interfere with the supply roll. A horizontal pin or shaft 97 is carried by the outer ends of the arms 95 and a roll 98 is freely rotatable on the shaft 97. The roll 98 is adapted to engage or bear downwardly against the periphery of the supply roll 72 and is faced with rubber or friction material to have driving engagement with the outermost convolution of the roll. The drive for the roll 98 comprises a flat rubber belt 99 operated over the above described roll 88 and the roll 98. There may be a single centrally disposed belt 99 engaged in annular grooves in the rolls 88 and 98. The belt 99 passes over an idler pulley 100 on the pin 96 and engages over a second idler 101 spaced forwardly from the pulley 100. The rubber belt 99 is extensible and contractible to compensate for changes in the angular position of the arms 95 as the diameter of the supply roll 72 grows less during operation of the machine. It will be seen that the forward feed roll 81 drives the adjustable roll 98 and that the belt 99 operatively connects the roll 98 with the roll 88 so that the roll 98 is effectively driven. The rotating roll 98 assists in rotating the feed roll 82 and in advancing the paper strip from the surface of the supply roll.

The drive for the feed means 12 is characterized by its adjustability whereby the material strip S may be advanced any selected or required distance during each phase of operation. The drive for the feed means includes a walking beam 102 having one end supported by a pivot pin 103 fixed on a wall of the case 10 (see Fig. 13). The walking beam 102 is arranged within the lower portion of the case 10 and is spaced above the crank shaft 19. The walking beam 102 extends in a direction transverse of the crank shaft 19. A connecting rod 104 has a bearing 105 engaged on the intermediate crank 106 of the crank shaft 19 and has its other end connected with the walking beam 102 by a pin 107. During each revolution of the crank shaft 19 the walking beam 102 swings or pivots up and down. A pair of flexible elements or driving chains 108 is connected with the walking beam 102 and extends to a compound sprocket 109 positioned below and adjacent the feed chain 87.

It is a feature of the invention that the connection of the chains 108 with the walking beam 102 is adjustable along the beam to vary the stroke or movement of the feed chain 87 and, therefore, vary the extent of advancement of the strip S. A longitudinal slot 110 of substantial length is provided in the upper portion of the walking beam 102. A block 111 is shiftable along the slot and carries a yoke 112 which projects above the beam. The engagement of the block 111 in the slot 110 holds the block against turning. A pin 113 passes through openings in the yoke 112 and carries an equalizing bar 114. The lower ends of the spaced chains 108 are anchored to the opposite end portions of the equalizing bar 114.

Accurate and conveniently operable means is provided for adjusting the block 111 along the slot 110 to shift the point of connection of the chains 108 with the beam 102, moving this point of connection toward or away from the axis of the walking beam 102 as required to regulate the stroke or advancement of the strip S. This adjusting means includes a screw 115 extending longitudinally through the slot 110 and having screw threaded engagement in an opening in the block 111. The screw 115 is engaged in an opening 116 in the walking beam 102 to be held against longitudinal movement and has a head 117 on its outer end exposed at the end of the beam 102 for ready engagement by a wrench or the like. A lock nut 118 is threaded on the screw 115 to normally lock or hold the screw against rotation. The screw head 117 and the nut 118 are located to be readily engageable by a wrench or similar tool inserted through an opening in the rear wall of the case 10. It will be seen that upon loosening the nut 118 the screw 115 may be rotated to shift the block 117 toward or away from the pivotal axis of the walking beam 102 to shorten or lengthen the stroke or movement imparted to the chains 108.

The compound sprocket 109, which is best illustrated in Fig. 8 of the drawings, is a clutched sprocket for producing movement of the chain 87 when turned by downward movement of the chains 108 but which imparts no motion to the chain 87 during the return stroke of the walking beam 102 and its chains 108. The sprocket 109 comprises two bolted together sections 119 provided at their outer ends with sprocket teeth 120. The chains 108 are trained over the series of teeth 120 and are anchored or fixed to the sprocket 119 as at 121 in Fig. 18. The sprocket sections 119 are tubular having a central longitudinal opening 122 which receives a horizontal shaft 123 with substantial clearance. The sprocket 109 is supported on the shaft 123 by anti-friction bearings 124 so that it may have free rotation on the shaft. A central internal annular groove 125 is provided in the sprocket sections 119 and a ring 126 is fixed in the groove. The ring 126 has a series of annular internal pitched faces 127, each terminating in an abrupt shoulder 128. A collar 129 is keyed to the shaft 123 within the sprocket 109 and has an annular enlargement or flange 130 which extends into the above mentioned groove 125. The flange 130 is provided with a finished cylindrical concentric peripheral surface. A ball or roller member 131 rides on each pitched surface 127 of the ring 126 and the members are cooperable with the periphery of the flange 130. Springs 132 are engaged between the shoulders 128 and the members 131 to yieldingly urge the members to ride down the faces 127 into cooperation with the peripheral surface of the flange 130. When the sprocket 109 is turned in a clockwise direction, as indicated by the arrow in Fig. 18, the members 131 are caused to ride inwardly on the surfaces 127 and thus almost immediately bind between the surfaces 127 and the periphery of the flange 130 to transmit rotation from the sprocket 109 to the shaft 123. When the sprocket 109 is given retrograde movement the members 131 ride back or out on the surfaces 127 and the sprocket 109 is free to turn without producing rotation of the shaft 123. The shaft 123 extends outwardly beyond both ends of the clutched sprocket 109 and is rotatably supported at one end by an anti-friction bearing 133 carried by a flange or bracket 134 of the case 10. A spacer 135 is provided on the shaft 123 between the bearing 133 and the adjacent bearing 124. The collar 129 within the sprocket 109 serves to space the two bearings 124 and the bearings have shouldered cooperation with the sprocket 109. A nut 136 is threaded on the shaft 123 and clamps against the outermost bearing 124. It will be seen that the structure just described serves to hold the clutched sprocket 109 against axial movement along the shaft 123.

The shaft 123 of the clutched sprocket 109 carries a sprocket 137 for driving the chain 87. The sprocket 137 is keyed on the end portion of the shaft 123 which projects beyond the bearing 133. A screw 138 is threaded in the end portion of the shaft 123 and clamps a washer 139 against the hub of the sprocket 137 to hold the sprocket in against the bearing 133, which in turn bears inwardly against the spacer 135. A lubricant passage 140 leads inwardly through the shaft 123 from the outer end of the screw 138 to carry lubricant to the interior of the collar 129 which has a lubricant channel 141 leading to the bearings 124.

The drive sprocket 137 keyed to the clutch shaft 123 is spaced below and forwardly of the rear feed roll 82 and an idler sprocket 142 is spaced below the feed roll sprocket 86 to direct the chain 87 over the drive sprocket 137. The idler sprocket 142 has an eccentric shaft 143 carried by suitable bearings 144 on the rear case bracket 84 and the eccentric shaft may be adjusted or turned so that the idler sprocket 142 takes up any slack that may develop in the chain 87. It will be seen that upon the downward stroke of the walking beam 102 that the chains 108 cause rotation of the sprocket 109 and this rotation is transmitted to the drive sprocket 137 through the clutch members 131 and the shaft 123 so that the chain 87 is moved a given distance to advance a predetermined length or portion of the paper strip S to the cutting and cup forming mechanism 13.

Means is provided to turn back or return the clutched sprocket 109 during the upward strokes of the walking beam 102. This means is preferably a spring means associated with the clutched sprocket 109. In the preferred construction illustrated the spring return for the sprocket 109 includes an anchor block 145 secured in an opening 146 of a flange or bracket 147 in the case 10. The block 145 is tubular to receive the projecting end portion of the shaft 123 and the block 145 may be of sufficient length to partially telescope over the nut 136. A cup or flange 150 may be provided on the adjacent end of the sprocket 109 to telescope over the end portion of the anchor block 145 with substantial clearance. A coiled torsional spring 148 surrounds the anchor block 145 and has an out-turned end portion engaged in a slot 149 in the flange 150 and has its other end portion anchored in an opening 151 in the anchor block 145. When the sprocket 109 is turned during the downward stroke of the walking beam 102 the spring 148 is subjected to torque or increased torque and energy is stored up in the spring. When the walking beam 102 begins its upward stroke the spring 148 turns the sprocket 109 back so that the chains 108 are rewound on the sprocket. The spring 148 operates to completely restore the sprocket 109 during each upward stroke of the walking beam 102 to prepare the sprocket for the next active stroke. During the return movement of the sprocket 109, that is, during the upward stroke of the walking beam 102 the clutch members 131 ride outward on the surfaces 127 or at least do not wedge between the surfaces 127 and the periphery of the flange 130 and the sprocket 109 is turned back without producing rotation of the shaft 123. Accordingly, the drive chain 87 of the paper feed means remains stationary during the return strokes or upward strokes of the walking beam 102. It is to be observed that the feed means 12 described in detail above is entirely automatic and operates to advance the paper strip a given distance, that is, to supply a given amount of paper to the mechanism 13, during each revolution of the crank shaft 19.

The mechanism 13 receives the strip S as it is advanced by the feed means 12 and cuts a disc-shaped cup blank from each strip portion thus advanced and then performs a number of operations on the blank to shape the same into a complete, strong, self-sustaining container or cup having a beaded or rolled rim. The mechanism 13 performs the several operations during the time period required for the advancement of each portion of the strip S, that is, during each complete up and down cycle of the walking beam 102, and the mechanism 13 may be operated rapidly to form a large number of completed cups per minute. The blank cutting and forming mechanism 13 comprises a number of forming dies and punches assembled and operated in concentric relation relative to a single axis so that all of the cup blank cutting and cup forming operations occur while the cup remains on a single axis. In the preferred structure illustrated the cup C moves but a short distance along a vertical axis without turning or rotating and is at the upper part or side of the case 10 at all times so that it cannot be soiled by the lubricant of the drive means, etc.

The mechanism 13 includes a supporting plate 152 mounted on the upper wall of the case 10 to extend across an opening 153 therein. A horizontal passage or guide channel 154 passes below this plate 152. The channel 154 extends from the forward feed roll 81 and serves to guide or direct the strip S to the mechanism 13 and to guide the scrap from the mechanism. The first operation performed by the mechanism 13 in the manufacture of a given cup C is the cutting of the cup blank and I will proceed with a description of the blank cutting means, best illustrated in Fig. 4.

The blank cutting means includes a fixed ring 155 and a movable ring or sleeve 156 cooperable one with the other to shear off the paper and thus form a disc-shaped blank. The stationary ring 155 is secured to the under side of the fixed plate 152 by screws 157 and projects downwardly beyond a centering flange 158 on the under side of the plate. The ring 155 has a flat lower end which is flush with the upper wall of the channel 154. In this connection it may be observed that the walls 159 of the channel structure are thickened at the mechanism 13 and the ring 155 is received in a vertical opening 160 which passes through this channel structure. The movable cutting ring or sleeve 156 is secured in the upper portion of a vertically movable cross head 161. The cross head 161 has a flanged or thickened lower portion provided with a central opening 162. An upstanding central hub or collar 163 is bolted or otherwise fixed to the thickened lower portion of the cross head 161 and the blank cutting sleeve 156 is secured in the collar 163 to project beyond its upper end. The cutting sleeve 156 has a flat upper end and the sleeve is proportioned to accurately or closely fit within the stationary ring 155. The sleeve 156 is movable between a position where its upper end is spaced below the channel 154 and the position where its upper portion is received within the ring 155, serving to cut the cup blank during this movement and operating to support the cup blank within the ring 155 when in its uppermost position. An annular member or ring 164 of rubber or other resilient material engages around the projecting upper portion of the movable blank cutting sleeve 156 and is engaged between the upper end of the collar 163 and the lower side of the stationary channel structure 159. The ring 164 is substantially compressed during the upward movement of the blank cutting sleeve 156 and serves to clear the sleeve 156 and return the same to its lower position.

The cross head 161 carrying the cutting sleeve 156 is operated by the power shaft or crank shaft 19. The means for operating the cross head 161 includes ears or lugs 165 projecting from opposite ends of the cross head 161 and pairs of operating rods 166 secured to the lugs 165 and projecting downwardly therefrom (see Fig. 14). Bull gears 167 are keyed or fixed to end portions of the shaft 19 which project beyond the bearings 20 and the inner sides of the bull gears 167 carry what I will term outer cams, 168. Each of the cams 168 has a lift or raised part 169 on its active peripheral face (see Fig. 15). A roller 170 is rotatably secured to the lower ends of each pair of rods 166 being carried by pins or shafts 171 fixed in the cross bars 172 which connect the lower ends of the adjacent rods 166. The rollers 170 cooperate with the cams 168. During each revolution of the crank shaft 19 the raised cam parts 169 cooperate with the rollers 170 to move the cross head 161 upwardly to actuate the cutting sleeve 156. As illustrated in Fig. 15, the raised cam parts 169 are relatively short and the cutter sleeve 156 remains in its actuated or raised position only a relatively short time and then returns to its idle or lower position when the rollers 170 leave the raised cam parts 169.

Immediately following the cutting of the blank the mechanism 13 pleats or flutes the blank to condition it for forming into the cup shape. The mechanism 13 includes a pair of cooperating flute forming members or dies; namely, a lower flute forming die or punch 173 and an upper flute forming die 174 (see Fig. 4). The lower die or punch 173 is movable vertically within the above described cutting sleeve 156, while the upper die 174 is stationary, being mounted in the plate 152. The lower die or punch 173 is a tubular member or ring having a central vertical opening 175 and the punch is shaped and proportioned to ride up and down within the sleeve 156 to be guided thereby. The upper die 174 is likewise a tubular or ring-like part having a central opening 176 which registers with an opening 177 in the plate 152. The upper die 174 is fixed to the under side of the plate 152 and may be secured in a central recess in the plate by the screws 157 which serve to attach the cutting ring 155 to the plate, as described above. The die 174 nests within the upper portion of the cutting ring 155 and has a flange 178 provided with openings which pass or receive the screws 157 (see Fig. 4).

The under side of the die 174 is dished, having a frusto-conical concave surface pitched upwardly and inwardly from the cutting ring 155 to the opening 176. A plurality of radial grooves 179 is provided in the dished-under surface of the die 174. The grooves 179 are equally circumferentially spaced and are identical in size and shape. The radial grooves 179 preferably have flat downwardly convergent side walls and flat bottom or upper walls which are pitched upwardly and inwardly toward the common vertical axis of the mechanism 13. The upper side of the lower flute forming die or punch 173 is formed to mate with or nest in the die 174 to press or form the flutes in the blank of the cup. The upper side of the punch 173 is frusto-conical, sloping upwardly and inwardly from its periphery to the central opening 175. A plurality of circumferentially spaced ribs 180 is provided on the upper side of the flute forming punch 173. The ribs 180 are identical in size and shape and are equally spaced one from the other. The grooves 179 and the ribs 180 are related so that the ribs 180 are adapted to enter the grooves to form the flutes in the paper blank. It will be seen that when the lower die or punch 173 is pressed upwardly within the stationary die 174 the grooves 179 and ribs 180 cooperate to form the flutes in the cup blank and the cooperation of the die and punch gives the blank its initial dished shape. It should be noted that the grooves 179 and ribs 180 diminish in depth as they extend inwardly and that they terminate some distance from the common vertical axis of the mechanism 13 leaving a plain or unfluted central portion in the blank.

The means for carrying and operating the flute forming punch 173 includes a cross head 181 disposed below the cross head 161 of the blank cutting means (see Fig. 4). The cross head 181 is flanged or reinforced and has a central vertical opening which receives a tubular upstanding column 182. A nut 183 may be threaded on the lower portion of the column 182 to clamp against the under side of the cross head 181 to secure the column to the head. The column 182 extends upwardly and is received within the tubular cross head 161. A flange 184 on the upper end of the column 182 is slidably received within the collar 163. Screws 185 removably secure the die or punch 173 to the upper side of the flange 184. The flange 184 and the punch 173 are effectively guided for vertical movement by the collar 163 and the cutting sleeve 156.

Cam means associated with the crank shaft 19 is provided to operate the cross head 181 of the flute forming punch 173. Pairs of spaced adjacent push rods or operating rods 186 are fixed to lugs or enlargements on the ends of the cross head 181 (see Fig. 14). The rods 186 extend downwardly to adjacent the bull gears 167 and the lower ends of the adjacent rods 186 are connected by heads or tie members 187 (see Fig. 15). An annular cam 188 is fixed to the inner side of each bull gear 167 within the outer cam 168. Each cam 188 has an outwardly projecting continuous cam track or cam ridge 189 and the tie members 187 on the rods 186 carry means for cooperating with these cam ridges. In practice, each tie member 187 carries an upper roller 190 for cooperating with the outer surface of a cam ridge 189 and carries a lower roller 191 for cooperating with the inner surface of the cam ridge 189. The rollers 190 and 191 are rotatably supported on shafts or pins 192 and 193, respectively, on the members 187. The cams 188 have identical shapes and settings and are formed to cause rather sudden or rapid upward and downward movement of the flute forming punch 173. The cooperation of the external surface of the cam ridges 189 with the rollers 190 produces the upward or active movement of the flute forming punch 173 and the engagement of the inner surfaces of the ridges 189 with the inner rollers 191 produces the return or downward stroke of the punch. It will be seen that during each revolution of the crank shaft 19 the flute forming punch 173 is positively operated up and down so that the flutes are formed in the cup blank and the blank is given a dished configuration.

When the flutes have been formed in the blank by the punch 173 and die 174, as just described, the mechanism 13 operates to compress the flutes of the cup blank and to give the blank its final cup shape, the collapsing or compressing of the flutes permitting or providing for the forming of the cup C to the required shape and also giving the wall of the cup substantial rigidity. The mechanism 13 includes a pair of cooperating die elements for giving the cup blank its cup shape. The lower die element is in the nature of a punch 194 and the upper die element is a socket-like die 195 facing downwardly to receive the punch 194 (see Fig. 4). In accordance with the invention the punch 194 and the die 195 are in coaxial telescopic relation with the other cup forming elements of the mechanism 13.

The cup forming die 194 is an elongate tubular member adapted to move up through the openings 176 and 177 with considerable clearance to enter or cooperate with the downwardly moving die 195 which is disposed above the plate 152. The punch 194 has a cylindrical lower portion and its upper portion is shaped to give the wall of the finished cup C the desired configuration. In the preferred construction the upper portion of the punch 194 is round in cross section and its external surface 196 gradually slopes upwardly and inwardly. This external active surface 196 of the punch 194 is smooth and regular to engage within the cup C without marring or distorting the paper of the cup. As best illustrated in Figs. 16 and 17, an annular upwardly facing shoulder 197 occurs on the exterior of the punch 194 where the sloping surface 196 mates or joins the cylindrical surface on the lower portion of the punch 194. This shoulder 197 is preferably flat and occupies a plane normal to the longitudinal axis of the punch 194. The upper end of the punch 194 is flat and normal to its longitudinal axis except for a raised annular ridge 198 occurring at its periphery.

The cup forming punch 194 is carried by a vertically movable rod or column 200 through the medium of a spring loaded slack connection. The column 200 has its lower portion received in a central opening 201 in a cross head 202 which is located below the crosshead 181. A flange 203 on the column 200 engages against the upper side of the cross head 202 and a nut 204 is threaded on the column 200 to engage against the under side of the cross head 202 and thus secure the column to the cross head. The column 200 passes upwardly through the column 182 with ample clearance and is provided with a central longitudinal opening 205 which extends through it from its upper end to its lower end. The upper end portion of the colum 200 is reduced in external diameter. A stem 206 is slidable in the upper portion of the column opening 205 and the stem is provided with a central longitudinal opening 207. The cup forming punch 194 is removably attached to the upper end of the slidable stem 206 to move therewith. A screw 208 is entered in the upper end of the punch 194 and its head has shouldered engagement within the punch. The screw 208 extend beyond the lower end of the punch 194 and is threaded in the opening 207 of the stem 206. The screw 208 has shouldered cooperation with the upper portion of the stem 206 at 209. Means is provided for limiting the movement of the stem 206 and punch 194 relative to the column 200. This means may include a pin 210 carried in a transverse opening in the stem 206. The pin 210 projects from opposite sides of the stem 206 and extends into diametrically opposite longitudinal slots 211 in the wall of the column 200.

In accordance with the invention the punch 194 is spring held or spring loaded, being urged upwardly so that it is spaced some distance above the upper end of the column 200 when in its idle or unactuated condition. The means for yieldingly urging the punch 194 upwardly comprises a coiled spring 212 arranged within the opening 205 of the column 200. The spring 212 is held under compression between the lower end of the punch carrying stem 206 and the upper end of a plug 213 threaded in the lower end of the column 200. The spring 212 is normally under compression to hold the punch 194 where its lower end is spaced above the upper end of the column 200 but the spring is yieldable and is subject to further compression when the punch 194 is engaged in the die 195 as will be later described.

The cup forming punch 194 is operated by the shaft 19 through the medium of crank pins and connecting rods. A crank pin 214 projects from the outer side of each bull gear 167 (see Fig. 14). The pins 124 are turnably engaged in openings 215 in the lower ends of connecting rods 216. The ends of the cross head 202 are provided with outwardly projecting studs or pins 217. These pins 217 are turnably received in openings 218 in the upper ends of the connecting rods 216. It will be seen how the crank means just described produces upward and downward movement of the cup forming punch 194 during each revolution of the crank shaft. In practice, the parts may be related so that the punch 194 is moving upwardly during the upward actuation of the flute forming punch 173 and the upper end of the punch 194 may be in a plane at the upper end of the grooved active face of the die 174 when the flute forming operation is completed. Immediately thereafter the flute forming punch 180 moves downwardly to free the cup blank and the punch 194 continues upwardly to push the cup blank upwardly from the die 174. In this connection it is to be observed that the inner corners or faces of the flute forming die 174 may be rounded or bevelled off so that the cup blank is not injured or distored when the punch 194 draws it upwardly out of the die 174.

The cup forming die 195 is removably carried by a cross head 219 disposed above the case 10 and spaced above the plate 152. A carrier 220 is bolted or otherwise secured to the under side of the cross head 219 and projects downwardly toward the plate 152. The carrier 220 has a socket 221 in its lower side whose longitudinal axis is concentric with the common axis of the several elements of the mechanism 13. An opening 222 of reduced diameter continues upwardly through the carrier 220 from the socket 221. The cup forming die 195 is centrally and vertically disposed within the socket 221. The die 195 is a tubular member received in the socket 221 with ample clearance and the upper end of the die 195 has an inturned head or flange 223 presenting an end of increased area which bears on the end wall of the socket. The exterior of the die 195 is cylindrical and of uniform diameter throughout.

The interior of the die 195 has an active cup shaping surface 224 corresponding in configuration to the surface 196. The surface 224 slopes downwardly and outwardly to the lower end 225 of the die 195. The lower end 225 of the die 195 is flat and lies in a horizontal plane. The end surface 225 is adapted to directly oppose the shoulder 197 of the punch 194 to form a step or shoulder 226 on the cup C (see Figs. 27 and 28). The cup shaping surface 224 of the die 195 has substantially the same inclination as the cup shaping surface 196 of the punch 194 and when the die and punch are cooperating the wall of the cup C is given its final flaring configuration by these cooperating surfaces. Further, it will be observed that the cooperating active surfaces of the punch 194 and die 195 compress the fluted wall of the cup blank and the flutes are converted into pleats or folds of double thickness, thus materially increasing the strength and stability of the cup. The die 195 may be secured in the carrier 220 by a bushing 227 which extends through the opening 222 of the carrier 220. The bushing 227 extends downwardly into the die 195 and has a flange 229 on its lower end which bears upwardly against the flange 223 of the die 195 to clamp the die upwardly against the upper wall of the socket 221. The bushing 227 projects upwardly beyond the upper end of the carrier 220 and an elongated cap 229ª is threaded on the projecting portion of the bushing and clamps against the upper end of the carrier 220 to secure the bushing in the carrier.

In accordance with the invention the cup forming die 195 moves downwardly as the cup forming punch 194 moves upwardly. In other words, the two cup forming elements move toward one another to form the cup C. The means for actuating the cup forming die 195 includes connecting rods 230 engaged on and operated by intermediate cranks 231 of the crank shaft 19 (see Fig. 14). Connecting rods 230 extend upwardly and outwardly from their cranks 231 and are pivotally connected with a traveling horizontally disposed bar 232. The bar 232 is provided at its under side with pairs of downwardly projecting ears 233. Horizontal pins 234 are carried in openings in the upper ends of the connecting rods 230 to connect the rods with the traveling bar 232. Rods 235 are attached to the end portions of the traveling bar 232 by screws 236 and extend upwardly to the cross head 219. As illustrated in Fig. 14 of the drawings the rods 235 may slidably pass through openings 237 provided in thickened end portions of the cross head 202. This assists in guiding and steadying the rods 235. The rods 235 are further guided by bushings 238 secured in openings 239 in the upper wall of the case 10. The upper ends of the spaced vertical rods 235 carry the cross head 219. It will be seen that the cross head 219 carrying the die 195 moves up and down through a complete cycle during each revolution of the crank shaft 19. The cranks or eccentric elements of the drive are so related that the upper cup forming die 195 moves downwardly as the cup forming punch 194 moves upwardly. These movements continue until the punch 194 "bottoms" in the die 195 to bring about the full compression of the flutes and to give the blank its permanent cup shape.

The mechanism 13 further embodies novel means for forming a bead B on the rim of the cup C. This means is associated with the cup forming elements just described and is driven by the same operating or driving means to form and complete the bead immediately following the shaping of the cup C. The bead forming means includes a sleeve 240 engaged around the die 195. The sleeve 240 is slidable or movable in the annulus existing between the exterior of the die 195 and the wall of the socket 221. The length of the sleeve 240 is such that the lower end of the sleeve is slightly below the lower end of the die 195 when the sleeve has its upper end bearing against the upper wall of the socket 221. The sleeve 240 is movable vertically but friction means is provided to resist such movement. A recess 241 is formed in the side wall of the socket 221 at the lower end of the carrier 220. The outer wall of the recess 241 converges or slopes upwardly and inwardly. Suitable friction material 242, such as fiber, or the like, is tightly packed in the recess 241 to offer substantial resistance to movement of the sleeve 240. An annular follower 243 is engaged against the lower end of the friction material 242. A gland or nut 244 is threaded on the lower end of the carrier 220 to force the follower 243 upwardly against the friction material 242. When the nut 244 is threaded upwardly the friction material 242 is tightly compressed against the sleeve 240. The friction material 242 serves to hold the sleeve 240 against vertical movement until the sleeve is subjected to a positive moving force. The importance and function of this friction holding means will be described below.

At the time when the die 195 and the punch 194 are moving together to shape the cup C the sleeve 240 is in a position where it projects a substantial distance below the lower end of the die 195. The friction material 242 holds the sleeve in this position and the sleeve moves downwardly with the carrier 220 without movement relative to the die 195. As best illustrated in Fig. 16 of the drawings, the internal diameter of the sleeve 240 is slightly greater than the external diameter of the cylindrical surface 245 of the punch 194. The clearance between the internal and external surfaces, respectively, of the sleeve 240 and punch 194 is just sufficient to receive the paper thickness of the cup blank. Preparatory to forming the bead B on the cup C it is necessary to iron out or remove the flutes from the edge portion 246 of the cup blank. This ironing out operation is performed by the internal surface of the sleeve 240 and the cylindrical external surface 245 of the punch 194. When the punch and die move together to shape the cup C there is relative movement between the punch 194 and the sleeve 240, the punch in effect moving through the projecting lower portion of the sleeve. The friction material holds the sleeve 240 against movement during this operation. The blank which is being shaped into cup form is positively pushed up by the punch 194 and as it moves upwardly its lower or edge portion 246 is drawn into the sleeve 240 and is thus forced to conform to the slight clearance space occurring between the internal surface of the sleeve 240 and the external cylindrical surface 245 of the punch 194. Thus, the edge portion 246 of the cup blank is smoothed out and is made cylindrical and is confined between the surface of the sleeve 240 and punch 194. A substantial edge portion 246 of the cup blank is drawn into the sleeve 240 and is smoothed or ironed out. When the punch 194 "bottoms" in the die 195 the cup shoulder 226 is formed by the coaction of the shoulders or surfaces 197 and 225 and the ironed out edge portion 246 of the cup blank extends downwardly from the shoulder 226 to adjacent the lower end of the sleeve 240. This is illustrated in Fig. 16.

The bead B is formed or rolled on the rim of the cup immediately following the cup forming and ironing out operations just described. The bead forming means includes a collar or sleeve 247 surrounding the cylindrical base portion of the punch 194 and secured to the upper end of the column 200. In practice, the sleeve 247 may have its lower end engaged on and secured to a tubular extension 248 screw threaded on the reduced upper end portion of the column 200. The sleeve 247 is fixedly secured to the column 200 and slidably receives the punch 194 which is spring loaded and slackly connected with the column 200, as above described. The upper end of the sleeve 247 is designed to curl up or roll up the ironed out portion 246 of the cup blank, the opposing ends of the sleeves 240 and 247 being formed to confine and press the bead B thus formed. The upper end of the sleeve 247 is provided with an annular downwardly and outwardly pitched face 249 which joins the internal surface of the sleeve 247 and which extends downwardly to a concaved upwardly facing annular shoulder 250. The wall of the shoulder 250 is smooth and curved. A steep downwardly and outwardly pitched annular face 251 extends downwardly from the shoulder 250 to an abrupt or axial shoulder 252 occurring at the exterior of the sleeve 247. The lower end of the upper sleeve 240 has an annular surface 253 that is pitched downwardly and outwardly from the internal surface of the sleeve 240 to a downwardly facing annular shoulder 254. The shoulder 254 opposes the shoulder 250 and has a curved concaved wall. A steep downwardly and outwardly pitched surface 255 continues downwardly from the shoulder 254 to the lower end of the sleeve 240. The surfaces 251 and 255 are complementary, that is, they are adapted to engage one with the other and the lower end of the sleeve 240 is engageable with the shoulder 252 when the surfaces 251 and 255 are in cooperation. The cooperation of the surfaces just mentioned serves to hold the inner pitched surfaces 249 and 253 spaced apart a short distance, thus leaving a pitched annular entrance to the space formed by the concaved opposing shoulders 250 and 254. The space left or provided by the concaved shoulders 250 and 254 is generally round in cross section but may be slightly ovaloid, as illustrated in Fig. 16.

When the punch 194 moves upwardly into the downwardly moving die 195 to form the cup C and to iron out the edge portion 246 the punch is projecting a substantial distance upwardly beyond the sleeve 247, being supported in this projecting position by the spring 212. When the punch 194 "bottoms" in the die 195 and can no longer move upwardly the column 200 continues its upward movement. The sleeve 247 continues on upwardly with the column 200. In other words, the spring loaded punch 194 is stopped through its engagement in the die 195 and the sleeve 247 continues upwardly around the punch. This forward movement of the sleeve 247 with respect to the punch 194 rolls or forms the bead B. The friction held sleeve 240 surrounding the die 195 is set or positioned by the means to be later described so that its lower end is engaged by the upper end of the sleeve 240 at the time of or prior to the "bottoming" of the punch 194 in the die 195. Accordingly, the friction held sleeve 240 is obliged to move upwardly with the sleeve 247 when the latter is moved upwardly around the punch 194. The cooperating surfaces 251 and 255 and the shoulder 252 engaged with the lower end of the sleeve 240 impart positive upward movement to the sleeve 240 so that the sleeve is moved against the action of the friction material 242. The parts are in the positions illustrated in Fig. 16 of the drawings when the sleeves 240 and 247 begin their simultaneous upward movement to form the bead B.

When the sleeves 240 and 247 move upwardly the pitched annular surface 249 on the upper end of the sleeve 247 catches or engages the lower edge of the cup blank portion 246 and directs the edge of the paper downwardly and outwardly to the cavity or space existing between and defined by the shoulders 250 and 254. As the upward movement of the sleeves continues the paper is directed downwardly into the space defined by the shoulders 250 and 254 and the configuration of this space is such that the paper is made to curl or roll upon itself. The paper thus received in the space between the shoulders 250 and 254 cannot escape because the surfaces 251 and 255 are in tight engagement and the paper is obliged to roll up between the shoulders 250 and 254. The ironed out edge portion 246 of the cup blank is positively confined by the external surface 245 of the punch 194 and the internal surface 246 of the sleeve 240 and cannot buckle, bend or wrinkle, and is positively forced into the space between the concaved shoulders 250 and 254. By the time the column 200 reaches the upper end of its strike the surface 249 of the sleeve 247 is at or adjacent the cup shoulder 246 and the bead B is completed. Fig. 17 of the drawings illustrates the positions of the parts at the completion of the bead forming operation.

The mechanism 13 further includes means for freeing or clearing the completed cup C from the die 195 so that it may be transferred or shifted away by the means 14. The cup clearing means includes a knockout block or stripper 256 disposed within the upper portion of the die 195 (see Fig. 4). The stripper 256 is a cylindrical block whose lower side is flat and horizontal except for an annular recess 257 at its periphery. The recess 257 is adapted to receive the above described ridge 198. The upper end of the stripper 256 normally bears on the flange 229 and when the cup C is formed the end of the cup is pressed upwardly against the bottom of the stripper so that the ridge 198 and the recess 257 form a raised bead or ridge on the bottom of the cup C. A stem 258 is provided on the top of the stripper 256 and passes upwardly through the bushing 227 and continues upwardly through the cap 229 to project outwardly through an opening in the upper end of the cap (see Figs. 4 and 5). The portion of the stem 258 within the lower portion of the cap 229 has an upwardly facing annular shoulder 259. A spring 260 is arranged under compression between the shoulder 259 and the upper wall of the cap. The spring 260 serves to urge the stripper 256 downwardly and the spring is yieldable to allow upward movement of the stripper when the punch 194 and die 195 are moved into cooperation to form the cup C.

When the cup C has been completed and the bead B has been rolled, the die 195 and the punch 194 separate; that is, the die moves upwardly and the punch moves downwardly. During this phase of the action the spring 260 expands and the stripper 256 moves downwardly together with the cup C and the punch 194. The spring urged stripper 256 effectively strips the cup C from the die 195 and assures the downward movement of the cup with the punch 194. The stripper 156 holds the cup C on the punch 194 until the cup C is engaged for removal by the means 14 to be later described, and immediately thereafter both of the springs 212 and 260 are relieved of their compression and the cup C is clear or free of both the sleeve 240 and the die 195.

Means is provided for venting the die 195 to permit the free entrance and discharge of air so that trapped air or reduced pressure conditions cannot interfere with the operation of the cup forming means. A longitudinal venting port 261 extends longitudinally through the stripper 228 and its stem 258 from the lower end of the stripper to a point within the cap 229 where it communicates with the interior of the cap. Lateral ports 262 are provided in the stripper 256 and lead from the vent port 261 to a reduced external portion of the stripper. The ports 262 place the interior of the die 195 above the stripper 256 in communication with the port 261.

Means is provided for restoring the friction held sleeve 240 during the upward movement or return of the cross head 219. Spaced posts 263 project from the upper side of the case 10 and a head 264 is secured to the upper ends of the posts. The head 264 has a central vertical opening 265 and a bushing-like abutment 266 is secured in the opening. The bushing 266 is adapted to receive the stem 258 and the cap 229 with ample clearance. The abutment 266 presents a flat horizontal lower surface of substantial area. The means for restoring the sleeve 240 further includes a series of spaced vertical openings 267 in the carrier 220. The openings 267 extend from the upper end of the carrier to the socket 221. Pins 268 are slidably or shiftably received in the openings 267. The lower ends of the pins 268 are adapted to cooperate with the upper end of the sleeve 240. When the sleeve 240 is in its fully raised position illustrated in Figs. 4 and 5 of the drawings the pins 268 project a substantial distance upwardly beyond the carrier 220. During the final portion of the upward movement of the cross head 219 the upper ends of the pins 268 come into engagement with the lower side of the abutment 266. This engagement stops further upward movement of the pins 268 and the several pins engaged with the sleeve 240 stop the upward movement of the sleeve. Thus the sleeve 240 is held stationary while the cross head 219 and the die 195 continue upwardly. By the time the cross head 219 reaches the upper end of its upward stroke the sleeve 240 and the die 195 are restored to their original relative positions for the next series of operations.

The cup transferring means 14 operates to withdraw the completed cups C from the mechanism 13 and to arrange them in a group or stack for ready counting, packaging, etc. The cup transferring means or ejecting means 14 is driven or operated by the drive means 11 in synchronism with the feed means 12 and the mechanism 13. In the preferred construction the cup transferring means 14 includes, what I will term, a carriage 270 (see Figs. 10 and 11). The carriage 270 is a flat, horizontal part which is substantially U-shaped in plan elevation. The opposite sides or edges of the carriage 270 are provided with flanged runners 271. The carriage 270 is shiftable along a top surface 272 of the case 10 and its runners 271 are guided by guides 273 so that it is movable toward and away from the vertical plane of operation of the mechanism 13.

Each side or arm of the carriage 270 has an upstanding stud 274 and a cup engaging and transferring finger 275 is pivotally supported on each stud 274. The cup transferring fingers 275 are alike or complementary and project toward the mechanism 13. The opposing inner edges of the fingers 275 are formed to have holding engagement with the cup C. The outer end portions of the fingers 275 have opposing semi-circular parts 276, whose curved inner faces have grooves 277. The parts 276 are adapted to engage about the inverted cup C held on the punch 194 by the stripper 256 and their grooves 277 are adapted to receive the cup bead B. The full lines in Figs. 10 and 11 illustrate the manner in which the parts 276 are adapted to engage about the cup C to grip the same for transference. Ears or lugs 278 project from the outer extremities of the parts 276 and the two lugs 278 are engageable with a stationary stop pin 279 to limit the inward swinging of the fingers 275 so that the parts 276 cannot crush or injure the cup C. As best illustrated in Fig. 10 of the drawings, the upper side or top of the case 10 has an elongate horizontal depression or recess 280 so that the cups carried by the fingers 275 may be transferred without engaging on the case.

The cup transferring means 14 is a two stage mechanism operating to advance the cups C by stages from the mechanism 13 to the stacking means. The inner sides or edges of the fingers 275 have opposing cup engaging parts 281 for engaging about the cups C to advance them during their second phase of movement. The parts 281 are spaced away from or outwardly from the primary cup engaging parts 276 and have curved partially circular inner edges for conforming to the cup. These curved edges 282 of the parts 281 are each substantially less than 180° in extent. The ends of the edges 282 which are most remote from the mechanism 13 are spaced apart a substantial distance when the fingers 275 are in their closed positions. Second stage holding plates 283 are mounted on the upper side of the case 10 to overlie the fingers 275. The plates 283 project inwardly or toward one another and each overhangs a finger 275. The inner edge of each plate 283 has a partially circular or curved edge surface 284. The plates 283 are positioned to overlie the parts 281 when the carriage 270 is in its forward position with the primary cup gripping parts 276 in position to grip the cup C on the punch 194. The plates 283 are spaced and formed so that their edge surfaces 284 are adapted to have frictional cooperation with a cup C when the cup is delivered between them by the primary cup engaging parts 276. This engagement of the edge surfaces 284 with the cup C does not in any way injure or distort the cup and is such that the cup may be readily withdrawn from between the plates 283 by the secondary cup gripping parts 281 during the return movement of the carriage.

The cup engaging fingers 275 are freely pivotable on the studs 274 and laterally or outwardly projecting levers 285 are fixed to the studs to turn the same. Yielding connections are provided between the studs 274 and the fingers 275 so that movement of the levers produces movement of the fingers. In the case illustrated these connections include leaf springs 286 engaged in openings in the studs 274 and projecting from the studs to cooperate with pins 287 on the fingers 275. Upon movement of the levers 285 in one direction the springs 286 press against the pins 287 to swing the fingers 275 toward one another to grip the cups. The fingers 275 actuated through these yielding or spring loaded connections cannot injure the cups. It is preferred to provide for the positive return or outward movement of the fingers 275. Arms 288 project from the studs 274 and have down turned lips 289 adapted to cooperate with the inner edges of the fingers 275. When the levers 285 are turned to swing the fingers 275 outwardly the lips 289 cooperate with the fingers to swing the same. Arcuate slots 290 are provided in the arms 288 and receive the pins 287.

A single drive mechanism operated by the means 11 serves to swing the fingers 275 in to and out of their cup engaging positions and serves to shift the carriage 270 between the cup receiving position, shown in Fig. 10, and the cup discharging position, shown in Fig. 11. The means for operating the carriage 270 and fingers 275 includes down turned brackets or flanges 291 on each side of the carriage 270 (see Figs. 12 and 13). These flanges 291 may depend from the runners 271. A double ended lever 292 is pivotally supported on each flange 291 by pins or bolts 293. The upper arms of the levers 292 extend upwardly through notches 294 in the runners 271 of the carriage 270 and the upper ends of the levers have notches 295. Balls or knobs 296 on the outer ends of the above described levers 285 are engaged in the notches 295 of the levers 292. It will be seen that pivoting of the levers 292 relative to the carriage 270 results in operation or swinging of the fingers 275.

In accordance with the invention the levers 292 serve to transmit motion to the carriage 270. The notches 294 in the carriage 270 receive the upper arms of the levers 292 with substantial clearance, that is, the arms of the levers 292 are adapted to have substantial motion in the notches for the actuation of the fingers 275. The end walls of the notches 294 form stops which limit pivotal movement of the levers 292 relative to the carriage 270. When the levers 292 are in cooperation with corresponding end walls of the notches 294 the force which brought the levers against the ends of the notches, if continued, results in movement of the carriage 270. The levers 292 being held against further pivoting with respect to the carriage serve as rigid projections for the transmission of such motion. Thus, it may be said that the free movement or slack movement of the levers 292 in the notches 294 provides for slack motion connections in which the initial or slack movement of the levers 292 operates the fingers 275. Upon operation or pivoting of the levers 292 the fingers 275 are first swung or operated and then the carriage 270 is bodily moved.

In addition to the cup transferring elements described above the cup handling or transferring means 14 includes a cup stacking mechanism.

The cup stacking mechanism includes a receiver means arranged above the top of the case 10 (see Fig. 5). Posts 297 project upwardly from the top of the case 10 and a carrier or head 298 is carried on the upper ends of the posts. A central vertical opening 299 in the head 298 has an upwardly facing annular shoulder 300. A tubular cup guiding member or receiver member 301 is arranged in the lower portion of the opening 299 and has a flange 302 which bears on the shoulder 300. A nut 303 is screw threaded in the upper portion of the opening 299 to clamp the flange 302 against the shoulder 300 to secure the member 301 to the head 298. The lower portion of the receiver member 301 is internally thickened and has an upwardly and inwardly sloping internal face 304 extending upwardly from its lower end. The inclined face 304 terminates in a cylindrical surface 305 which in turn terminates in an upwardly facing concaved shoulder 306. The received member 301 is vertically split or provided with a multiplicity of longitudinally extending slots 307 which lead upwardly from its lower end. The slots 307 render the member 301 extensible and contractible. A coiled annular contraction spring 308 is engaged in an external groove 309 in the receiver member 301 to yieldingly contract the member to the condition or size for the reception of the cups.

A cup retaining tube 310 is secured in the member 301 and the nut 303 and projects upwardly a substantial distance to carry or receive a stack of cups. The tube 310 has a plurality of spaced vertical slots 311 of substantial length extending downwardly from its upper end. The slots 311 render the tube 310 expansible and contractible. The exterior of the upper portion of the tube 310 has a multiplicity of spaced annular grooves 312 and an annular contraction spring 313 is engageable in the grooves 312. The spring 313 may be adjusted vertically from one groove 312 to another to vary the internal diameter of the tube 310 and thus vary the degree of tightness with which the tube receives the cups C. This adjustment of the tube 310 determines how closely the cups are stacked when they are forced one within the other in the receiver tube.

The cup receiving means just described is in vertical alignment with the end of travel of the secondary cup engaging parts 281 of the cup transferring fingers 275, that is, the cup receiver means is in vertical alignment with the outermost station of the cup transfer means. Stacking means is provided for elevating the cups C from the outermost station of the cup transferring mechanism into the receiver tube 310. This stacking means includes a vertically movable stacking rod 314. The stacking rod 314 has its lower portion within the case 10 and is guided within the case by a bearing or guide 315 on the adjacent wall of the case. The stacking rod 314 is further guided by a bushing 316 secured in a bracket 317 mounted on the under side of the case top. The upper end of the stacker rod 314 is provided with a cap or head 318 for engaging in the cups C. The head 318 is shaped and proportioned to conform to the interiors of the cups C and is replaceably secured to the upper end of the rod 314 by a screw 319. A longitudinal air vent 320 extends through the screw 319 from its upper end and communicates with a lateral vent port 321 in the stacker rod 314. The vent 320 and port 321 prevent superatmospheric pressure conditions and reduced pressure conditions from being developed from within the cups C to interfere with their stacking. The stacking rod 314 is operated by or from the above described walking beam 102 (see Fig. 13). Links 322 are pivotally secured to the outer end of the walking beam 102 by studs 323 and extend upwardly from the beam. The upper ends of the connecting rods or links 322 are pivotally engaged on studs 324 projecting from a collar 325 fixed on the stacker rod 314. It will be seen that during each revolution of the crank shaft 19 the walking beam 102 is reciprocated and the stacker rod 314 moves up and down. During upward movement of the stacker rod 314 its head 318 passes through an opening 326 in the upper wall structure of the case 10 and engages in the cup C at the outermost station of the cup transferring means to elevate the cup into the receiver member 301 and the tube 310.

The means for driving or operating the cup transferring means includes a pair of cam levers 327 disposed in vertical planes and operatively connected with the levers 292 mounted on the opposite sides or runners 271 of the carriage 270, as above described. The lower ends of the cam levers 327 are pivotally supported by pins or studs 328 projecting inwardly from the opposite side walls of the case 10 (see Fig. 13). The cam levers 327 lie in vertical planes in or adjacent the planes occupied by their respective levers 292 of the carriage 270. The upper ends of the cam levers 327 are operatively connected with the lower arms of the levers 292. In the construction illustrated links 329 are pivotally connected with the upper ends of the cam levers 327 and are pivotally connected with the lower ends of the adjacent carriage levers 292 to operatively connect the respective levers.

The cam levers 327 are moved or operated by the stacking rod 314 and their movement is controlled to some extent by the cross head 202 of the cup forming punch 194. The cam levers 327 have longitudinal or generally vertical cam slots 330 and the stacking rod 314 carries rollers 331 which operate in the slots 330. The rollers 331 are rotatably supported on the pins 332 projecting from opposite sides of the collar 325 or an extension thereof. Each cam slot 330 has a lower portion which slopes downwardly and to the right as viewed in Fig. 13 and an upper portion which slopes upwardly and to the right as seen in Fig. 13. The rollers 331 ride along the walls of the angular cam slots 330 to impart the required motion to the cam levers 327. When the rollers 331 move upwardly with the stacking rod 314 they ride along the right hand walls of the cam slots 330 to cam or swing the levers 327 to the right as seen in Fig. 13. The rear or right hand edge of each cam lever 327 is engaged by a roller 333. The rollers 333 are rotatably carried by horizontal pins 334 on projecting parts of the cross head 202. The rear edges of the cam levers are straight at their upper portions except for depressions or notches 335 in spaced adjacent relation to the upper ends of the levers, and downwardly facing shoulders 336 occurring adjacent the lower ends of the cam slots 330.

Means are provided to cause sudden or rapid movement of the cam levers 327 to the left, as viewed in Fig. 13, to produce a rapid closing movement of the fingers 275 about the cup C on the punch 194. During downward movement of the rollers 333 from the upper ends of their stroke the rollers are adapted to snap out of the notches 335 to cause this sudden movement of the cam levers 327 to the left. A detent means or cam means is provided on each lever 327 to cause movement of the levers to the right, as viewed in Fig. 13, to insure engagement of the rollers 333 in the notches 335 during upward movement of the rollers 331. A cam or dog 337 is pivoted on a side of each cam lever 327. The dogs 337 have noses which project into the paths of movement of the rollers 331. The dogs 337 are counter-balanced or shaped to normally assume positions where their noses project into the paths of the rollers 331. Arcuate slots 338 are formed in the cam levers 327 and the dogs 337 have pins or lugs 339 which are received in the slots. The engagement of the lugs 339 with the ends of the arcuate slots 338 limit pivoting of the dogs.

At the cup engaging phase of operation of the means 14 the rollers 333 carried by the cross head 202 start down ahead of the rollers 331. The rollers 333 snap out of the notches 335 to thereafter ride down on the straight rear edges of the cam levers 327. The sudden disengagement of the rollers 333 from the notches 335 and the subsequent engagement of the rollers with the rear edges of the levers 327 result in a sudden movement of the levers 327 to the left, as viewed in Fig. 13. This sudden movement of the levers 327 to the left causes sudden pivoting of the carriage levers 292 to take up the play or slack in the notches 297 and the sudden movement of the levers 292 closes the fingers 275 about the cup C which is engaged on the punch 194. During this action the rollers 331 are moving downwardly in the upper angular portions of the slots 330 without playing any active part and the rollers 331 merely ride by the dogs 337 and come into cooperation with the sloping left hand walls of the lower angular parts of the slots 330 to swing the levers 327 to the left and thus produce movement of the carriage 270, as will be described below.

The operation of the means 14 and its driving or operating mechanism will now be described. Assuming that the carriage 270 is at the retracted position or at the left hand end of its stroke, as seen in Fig. 11, the fingers 275 are closed, as shown in full lines in Fig. 11. This will be considered as the starting position of the cycle of movement of the carriage 270. At this time the rollers 331 are at the lower ends of the slots 330 and the rollers 333 are at or near the lower ends of their stroke. The rollers 331 actuated by the stacking rod 314 begin their upward movement through the slots 330. As the rollers 331 move up in the slots 330 they cooperate with the sloping walls of the slots to produce movement of the levers 327 to the right, as seen in Fig. 13. The first movement of the levers 327 to the right results in pivoting of the levers 292 so that the levers move in their notches 284. This pivots the levers 285 to open the fingers 275. Thus, the fingers 275 are opened before the carriage 270 begins its movement toward the mechanism 13. When the fingers 275 open the stacker head 318 comes into the cup C that was held by the finger parts 281 and pushes this cup upwardly into the receiver tube 310. Thus, it will be observed that the cup stacking means operates in synchronism with the cup transferring means to elevate the cup from the second transfer station into the receiver 14. The cup at the first transfer station is held or retained by the plates 283 when the fingers 275 are opened, as just described.

The fingers 275 are opened by the initial movement of the rollers 331 upwardly in the slots 330 and when the slack has been taken up at the notches 294 and the levers 292 are in engagement with the end walls of the notches further upward movement of the rollers 331 results in movement of the carriage 270 to the right. The rollers 331 cooperating with the inclined right hand walls of the slots 330 pivot the cam levers 327 to the right. This moves the lower arms of the carriage levers 292 to the right and tends to pivot the levers with respect to the carriage 270. However, the upper arms of the levers 292 are stopped against the end walls of the notches 294 and the levers 292 cannot pivot with respect to the carriage 270. As a result the right hand movement transmitted to the lower arms of the levers 292 results in bodily movement of the levers 292 to the right and the carriage 270 is carried with the levers. Accordingly, the carriage 270 is moved to the right with its fingers 275 open and the rollers 331 continue to move upwardly through the slots 330 into the upper portions of the slots to bring the carriage 270 to a position where its open fingers 275 have their parts 276 at opposite sides of the punch 194 in positions to close about the cup C on the punch. During the upward movement of the rollers 331 through the slots 330 they come into engagement with the dogs 337 and the engagement with the dogs 337 causes the levers 327 to move to the right to bring the walls of the notches 335 into cooperation with the rollers 333.

The rollers 333 carried by the cross head 202 have moved upwardly during the above described operations and are engaged in the notches 335 by the engagement of the rollers 331 with the dogs 337 as above described. The rollers 333 begin to move downwardly previous to downward movement of the rollers 331. The initial downward movement of the rollers 333 causes the rollers to snap out of the notches 335 and produce a sudden pivoting of the cam levers 327 to the left. This movement is just sufficient to pivot the levers 292 to take up the slack or play in their notches 294 bringing them against the end walls of the notches. The sudden pivoting of the levers 292 caused by the rollers 333 snapping out of the notches 335 suddenly closes the fingers 275 onto the cup C which is engaged on the punch 194. At the time the fingers 275 close about the cup C on the punch 194 the die 195 and the sleeve 240 are clear of the cup and the springs 212 and 260 have been relieved of their compression so that the cup C is free to be transferred by the means 14. The finger parts 276 move inwardly so that their grooves 277 receive the cup bead B and the engagement of the fingers with the bead sustains and retains the cup so that the cup is held by the fingers as the punch 194 moves down out of the cup.

During the closing of the fingers 275 the rollers 331 move downwardly in the angular upper portions of the slots 330 but produce no movement of the levers 327. The rollers 331 move downwardly past the dogs 337 and come into active engagement with the sloping left hand walls of the lower parts of the slots 330. The rollers 331 moving downwardly along the sloping walls of the slots 330 swing the levers 327 to the left as viewed in Fig. 13. As the upper arms of the levers 292 are already engaged against the right hand walls of their notches 294, left hand swinging of the cam levers 327 results in bodily movement of the carriage 270 to the left, the levers 272 being unable to pivot further. Movement of the carriage 270 to the left transfers the cup C from the means 13 to a position at the plates 283. Movement of the carriage 270 to the left also transfers the cup that was held by the plates 283, moving this cup into alignment with the stacker head 318. The finger parts 281 engage this cup as the carriage 270 moves to the left and pick up the cup to carry it to a position for engagement by the stacker head 318. The rollers 331 move to the lower ends of the slots 330 to complete movement of the carriage 270 to the left. The rollers 333 on the cross head 202 reach the lower ends of their movement at the shoulders 336 before the rollers 331 complete their downward movement. At the completion of downward movement of the rollers 331 the carriage 270 is at the left hand end of its stroke ready for the start of the next cycle of operation.

The means 15 is provided to facilitate the removal or discharge of the paper scrap that is left following the cutting of the cup blanks by the mechanism 13. The means 15 serves to assure parting of the paper scrap into two distinct strips and operates to positively advance these strips from the machine. The means 15 includes what may be termed a driving roller 340 carried by a horizontal shaft 341 supported in the upper portion of the case 10 (see Fig. 4). The roll 340 is driven by the endless chain 87. A sprocket 342 is fixed on the rotatable shaft 341 and is engaged by the chain 87. The roll 340 is located below the channel 154 and, as illustrated in Fig. 4 of the drawings, the channel may have a downwardly directed portion 344 which delivers the scrap paper to the upper side of the rotating roll 340. The roll 350 carries an intermediate flange or ridge 345. The ridge 345 is annular and presents sharp edges or corners. The periphery of the roll 340 at opposite sides of the ridge 345 is covered or faced with rubber 346 or other yielding resilient material.

The means 15 further includes a cutting wheel 347 cooperable with the roll 340. The cutting wheel 347 is above the roll 340 and has an annular groove presenting cutting edges 348 which cooperate with the ridge 345 to cut the paper scrap. The wheel 347 is proportioned so that its annular groove receives or partially receives the ridge 345 and the ridge cooperating with the cutting corners or cutting edges 348 assures the effective shearing or cutting of the paper. The cutting wheel 347 is carried by a floating rotatable shaft 349. The shaft 349 is urged downwardly so that the wheel 347 compresses the rubber 346 at opposite sides of the ridge 345 to assure the proper cutting action and to clear the paper from the roll. In the construction illustrated in Fig. 24 caps or shoes 350 engage downwardly against the shaft 349 at opposite sides of the cutting wheel 347. Springs 351 urge the shoes 350 downwardly so that the cutting wheel 347 is forced against the roll 340 to compress its rubber 346 at opposite sides of the cutting ridge 345.

The paper feed means 12 and the blank cutting and cup forming mechanism 13 are preferably synchronized so that the means 13 cuts out blanks in the paper strip S in close relation. In fact, it is preferred to so relate the parts that the openings in the strip S formed by the cutting ring 155 and cutting sleeve 156 slightly overlap, that is, join at the center of the paper strip. When the openings cut by the blank forming means thus join the scrap left after cutting of the cup blanks is in two distinct parts. However, it may occur that the openings formed in cutting out the cup blanks do not join, in which case the opposite edge portions of the scrap strip are connected by webs. As the scrap strip reaches the mechanism 13 it passes between the roll 340 and the cutting wheel 347. The cutting wheel cooperating with the ridge 345 positively cuts any webs that may still connect the opposite edge portions of the scrap strip, thus assuring the formation of two entirely separate strips of scrap. These strips of scrap paper are fed out through a chute 351 by the feed roll 82 to discharge from the rear of the machine and an appropriate catcher 352 may be provided to receive the scrap. The chute 351 extends rearwardly from the roll 340 and, of necessity, passes the cup stacking means. It is desirable to maintain the paper scrap entirely clear from the cup stacking means. This may be accomplished by providing a tubular housing 354 which extends downwardly from the opening 326 to a point below the chute 351. The housing 354 passes through a vertical opening 355 in the chute 351. The paper scrap is obliged to pass by the opposite sides of the housing 354 and cannot interfere with the cup stacking means. The stacking head 318 and the rod 314 operate through the housing 355 with clearance.

It is believed that the operation of the machine of this invention will be readily understood from the foregoing detailed description. As already pointed out, a single machine of the invention may be easily and quickly conditioned to produce cups or containers of practically any size. When it is desired to condition the machine to produce cups of a selected size the blank cutting rings 155 and 156, the flute forming elements 173 and 174, and the cup forming elements 194 and 195 with their associated sleeves 240 and 247 are detached and are replaced by corresponding elements of the desired size. In this connection it is to be observed that all of these parts of the mechanism 13 are attached or mounted in such a manner that they may be easily removed and replaced and are all accessible at the upper side of the machine. The anchor block 111 of the chains 108 is adjusted along the walking beam 102 to vary or regulate the amount of paper fed to the mechanism 13 during each operation and the stacker head 318 is replaced by a head shaped and proportioned as required. In a like manner the receiver member 301 and the receiver tube 310 are replaced by corresponding parts of the selected size. The stacker head 318 and the receiver parts 301 and 310 are readily accessible and are attached in such a manner that they may be readily replaced. The machine requires no alteration in the driving mechanism or any of the other parts to make it adaptable for the forming of cups of the selected size. In this connection it is important to note that the cup forming punch 194 is spring loaded and has substantial movement relative to its column 200 so that the cup forming mechanism is suitable for the shaping of cups requiring varying degrees of movement. The machine is entirely automatic in operation and may be fully controlled solely by operation of the clutch lever 54 and by the paper feed control handle 92. It is to be understood that any appropriate or required lubrication means may be employed for lubricating the working parts within the case 10. Such lubrication being supplied within the case cannot reach or soil the paper strip S or the cups C which always remain at the exterior of and above the case.

Having described only a typical preferred form and application of my invention, I do not wish to be limited or restricted to the specific details herein described, but wish to reserve to myself any variations or modifications that may appear to those skilled in the art and fall within the scope of the following claims.

Having described my invention, I claim:

1. In a cup making machine for producing cups from a strip of cup-material, cooperating annular cutters for completely cutting a blank from said strip, and cup forming means bodily shiftable axially relative to the cutters and including cooperating male and female die elements in coaxial relation with the cutters and shiftable relative thereto for shaping the blank into a cup, certain of said die elements passing through the cutters during cup forming operation.

2. In a cup making machine for producing cups from a strip of cup-material, cooperating annular cutters completely cutting a blank from said strip, coacting flute forming dies in coaxial relation to the cutters for forming flutes in the blank, at least one of the flute forming dies moving through the cutters during cup forming operation, and cooperating male and female cup-forming dies in coaxial relation to the cutters and both shiftable relative to the cutters for shaping the fluted blank into a cup.

3. In a cup making machine for producing cups from a strip of cup-material, cooperating annular cutters cutting complete round blanks from said strip, coacting flute forming dies in coaxial relation to the cutters for forming flutes in the blanks, at least one of the flute forming dies moving through the cutters during operation, and cooperating male and female cup-forming dies in coaxial relation to the cutters both shiftable relative to the cutters shaping the fluted blank into a cup, at least one of the cup forming dies moving through the cutters during cup forming operation.

4. In a cup making machine for producing cups from a strip of cup-material, cooperating annular cutters cutting complete round blanks from said strip, one cutter being stationary, male and female cup forming dies in coaxial relation to the cutters both movable relative to the cutters and into cooperation to form a blank into a cup, one of the dies being movable through the cutters during cup forming operation, and means for stripping the cup from the dies.

5. In a cup making machine for producing cups from a strip of cup-material, cooperating annular cutters cutting complete round blanks from said strip, one cutter being stationary, male and female flute forming dies in coaxial relation to the cutters cooperable to form flutes in a blank, one flute forming die being stationary, the other being movable through the cutters, and male and female cup-forming dies cooperable to form the fluted blank into a cup and arranged in coaxial relation to the cutters and both shiftable relative to the cutters, one of the cup-forming dies being above the cutters, the other being movable through the cutters during cup forming operation.

6. In a die mechanism of the character described, a pair of die parts moved toward each other to form a cup, a pair of sleeves for forming a bead on the cup, one sleeve being shiftably related to each die part, and friction means normally resisting movement of one sleeve relative to its related die part.

7. In a die mechanism of the character described, a pair of die parts moved toward each other to form a cup, a pair of sleeves for forming a bead on the cup, one sleeve being shiftably related to each die part, friction means normally resisting movement of one sleeve relative to its related die part, said sleeve being moved by the other sleeve in one direction as the bead is formed, and means operable to return the said sleeve following each bead forming operation.

8. In a die mechanism of the character described, a pair of die parts moved toward each other to form a cup, a pair of sleeves for forming a bead on the cup, one sleeve being shiftably related to each die part, friction means normally resisting movement of one sleeve relative to its related die part, said sleeve being moved by the other sleeve in one direction as the bead is formed, and means operable to return the said sleeve following each bead forming operation including a stop against which a projection on said sleeve is moved by movement of its supporting die part.

9. A die mechanism of the character described including, a stationary downwardly facing female fluting die, a stationary blank cutter surrounding the female fluting die, a vertically movable female cup die in line with the female fluting die to receive a fluted blank therefrom, a bead forming sleeve surrounding the female cup die and shiftable relative thereto, a vertically movable male fluting die to cooperate with the female fluting die, a male cup die vertically movable to cooperate with the female cup die, and a bead forming sleeve surrounding the male cup die and shiftable relative thereto and operable to cooperate with the other sleeve.

10. A die mechanism of the character described including, a stationary downwardly facing female fluting die, a stationary blank cutter surrounding the female fluting die, a vertically movable female cup die in line with the female fluting die to receive a fluted blank therefrom, a bead forming sleeve surrounding the female cup die and shiftable relative thereto, a vertically movable male fluting die to cooperate with the female fluting die, a male cup die vertically movable to cooperate with the female cup die, a bead forming sleeve surrounding the male cup die and shiftable relative thereto and operable to cooperate with the other sleeve, and means normally frictionally holding one of the sleeves against movement on its support.

11. A die mechanism of the character described including, a stationary downwardly facing female fluting die, a stationary blank cutter surrounding the female fluting die, a vertically movable female cup die in line with the female fluting die to receive a fluted blank therefrom, a bead forming sleeve surrounding the female cup die and supported thereby to be shiftable relative thereto, a vertically movable male fluting die to cooperate with the female fluting die, a male cup die vertically movable to cooperate with the female cup die, a bead forming sleeve surrounding the male cup die and shiftable relative thereto and operable to cooperate with the other sleeve, and means normally yieldingly resisting movement of the first mentioned sleeve relative to the female cup die.

12. A die mechanism of the character described including, a stationary downwardly facing female fluting die, a stationary blank cutter surrounding the female fluting die, a vertically movable female cup die in line with the female fluting die to receive a fluted blank therefrom, a bead boring sleeve surrounding the female cup die and shiftable relative thereto, a vertically movable male fluting die to cooperate with the female fluting die, a male cup die vertically movable to cooperate with the female cup die, a bead forming sleeve surrounding the male cup die and shiftable relative thereto and operable to cooperate with the other sleeve, and means simultaneously moving the cup dies toward one another including a yielding drive for one of them.

13. A die mechanism of the character described including, a stationary downwardly facing female fluting die, a stationary blank cutter surrounding the female fluting die, a vertically movable female cup die in line with the female fluting die to receive a fluted blank therefrom, a bead forming sleeve surrounding the female cup die and shiftable relative thereto, a vertically movable male fluting die to cooperate with the female fluting die, a male cup die vertically movable to cooperate with the female cup die, a bead forming sleeve surrounding the male cup die and shiftable relative thereto and operable to cooperate with the other sleeve, and means for introducing atmospheric pressure between the cup dies when they are together.

14. A die mechanism of the character described including, a stationary downwardly facing female fluting die, a stationary blank cutter surrounding the female fluting die, a vertically movable female cup die in line with the female fluting die to receive a fluted blank therefrom, a bead boring sleeve surrounding the female cup die and shiftable relative thereto, a vertically movable male fluting die to cooperate with the female fluting die, a male cup die vertically movable to cooperate with the female cup die, a bead forming sleeve surrounding the male cup die and shiftable relative thereto and operable to cooperate with the other sleeve, and means simultaneously moving the cup dies toward one another including a yielding drive for the male cup die.

15. A die mechanism of the character described including, a stationary downwardly facing female fluting die, a stationary blank cutter surrounding the female fluting die, a vertically movable female cup die in line with the female fluting die to receive a fluted blank therefrom, a bead forming sleeve surrounding the female cup die and shiftable relative thereto, a vertically movable male fluting die to cooperate with the female fluting die, a male cup die vertically movable to cooperate with the female cup die, a bead forming sleeve surrounding the male cup die and shiftable relative thereto and operable to cooperate with the other sleeve, means simultaneously moving the cup dies toward one another including a yielding drive for one of them, and means yieldingly resisting movement of the sleeve surrounding the female cup die from a position where it projects from the female cup die so it is moved relative to the cup die by the other sleeve after the cup dies are in full cooperative engagement.

LEO M. HARVEY.

REFERENCES CITED

The following references are of record in the file of this patent:

UNITED STATES PATENTS

| Number | Name | Date |
| --- | --- | --- |
| 2,017,054 | Brunn | Oct. 15, 1935 |
| 2,215,698 | Harvey | Sept. 25, 1940 |
| 1,740,844 | Strout | Dec. 24, 1929 |
| 2,006,040 | Crane | June 25, 1935 |
| 1,578,854 | Schoendelen | Mar. 30, 1926 |
| 1,959,342 | Butler | May 22, 1934 |
| 2,254,291 | Joa | Sept. 2, 1941 |
| 2,268,937 | Harvey | Jan. 6, 1942 |
| 1,799,357 | Davis | Apr. 7, 1931 |
| 2,177,652 | Hill | Oct. 31, 1939 |
| 1,990,598 | Freeman | Feb. 12, 1935 |